(12) United States Patent
Krochmal et al.

(10) Patent No.: US 10,111,027 B2
(45) Date of Patent: *Oct. 23, 2018

(54) COMPANION APPLICATION FOR ACTIVITY COOPERATION

(71) Applicant: APPLE INC., Cupertino, CA (US)

(72) Inventors: Marc J. Krochmal, Santa Clara, CA (US); Christopher S. Linn, Palo Alto, CA (US); John J. Iarocci, Los Gatos, CA (US); Geoffrey G. Stahl, San Jose, CA (US); Jaques P. Gasselin de Richebourg, Palo Alto, CA (US); Alexander R. Ledwith, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,785

(22) Filed: Dec. 5, 2016

(65) Prior Publication Data

US 2017/0303072 A1 Oct. 19, 2017

Related U.S. Application Data

(63) Continuation of application No. 14/586,511, filed on Dec. 30, 2014, now Pat. No. 9,544,714.
(Continued)

(51) Int. Cl.
*H04B 7/00* (2006.01)
*H04W 4/00* (2018.01)
(Continued)

(52) U.S. Cl.
CPC ............ *H04W 4/008* (2013.01); *G06F 9/542* (2013.01); *H04L 5/0035* (2013.01); *H04W 4/80* (2018.02)

(58) Field of Classification Search
CPC ..... H04L 12/2812; H04L 67/10; H04W 4/008
See application file for complete search history.

(56) References Cited

U.S. PATENT DOCUMENTS 8,850,052 B2   9/2014  Rosenblatt
8,990,273 B2   3/2015  Iarocci
(Continued)

FOREIGN PATENT DOCUMENTS

KR    10-2013-0075783 A    7/2013
KR    10-2013-0124363 A    11/2013
WO    2015/183403 A1    12/2015

*Primary Examiner* — Golam Sorowar
*Assistant Examiner* — Max Mathew
(74) *Attorney, Agent, or Firm* — Invoke

(57) ABSTRACT

The described embodiments augment an activity performed in a first application at a source electronic device using a controller at a companion electronic device. The source electronic device receives controller information describing a controller that the activity performed in the first application accepts controller data from, determines a controller identifier for the controller information, and broadcasts a controller advertisement comprising the controller identifier. Upon receiving the controller advertisement, the companion electronic device determines whether a second application that can provide the controller data is available at the companion electronic device. If the second application is available, the companion electronic device establishes a cooperative-activity communication channel with the source electronic device. The companion electronic device uses the cooperative-activity communication channel to provide controller data to the source electronic device. The source electronic device provides the controller data to the first application to cause a corresponding action to be performed.

20 Claims, 16 Drawing Sheets

Related U.S. Application Data

(60) Provisional application No. 62/005,793, filed on May 30, 2014.

(51) Int. Cl.
*H04L 5/00* (2006.01)
*G06F 9/54* (2006.01)
*H04W 4/80* (2018.01)

(56) References Cited

U.S. PATENT DOCUMENTS

| | | | |
|---|---|---|---|
| 9,270,708 B2 | 2/2016 | Dave et al. | |
| 2008/0280684 A1* | 11/2008 | McBride | A63F 13/12 463/42 |
| 2010/0082784 A1* | 4/2010 | Rosenblatt | H04L 12/2812 709/222 |
| 2011/0158652 A1* | 6/2011 | Friedman | H04B 10/1149 398/116 |
| 2011/0276619 A1* | 11/2011 | Khan | H04L 67/141 709/203 |
| 2012/0185520 A1 | 7/2012 | Iarocci | |
| 2013/0007499 A1 | 1/2013 | Moy | |
| 2014/0237123 A1 | 8/2014 | Dave et al. | |
| 2015/0312858 A1* | 10/2015 | Kerai | H04W 52/0212 370/311 |
| 2015/0350814 A1 | 12/2015 | Krochmal et al. | |

* cited by examiner

COMPANION APPLICATION FOR ACTIVITY COOPERATION

RELATED APPLICATIONS

This application is a continuation of U.S. application Ser. No. 14/586,511, filed 30 Dec. 2014, entitled "Companion Application For Activity Cooperation," which claims priority under 35 U.S.C. § 119 to U.S. Provisional Application No. 62/005,793, entitled "Companion Application for Activity Cooperation," by the same inventors, filed on 30 May 2014. The instant application is related to pending U.S. patent application Ser. No. 14/586,566, which is entitled "Activity Continuation Between Electronic Devices," by inventors Christopher S. Linn, Keith Stattenfield, Christopher C. Jensen, Alexander R. Ledwith, David A. Carter, Marc Krochmal, John J. Iarocci, and Jonathan M. Grynspan, filed on the same day as the instant application, and the contents of which are incorporated herein by reference.

The instant application is also related to pending U.S. patent application Ser. No. 14/475,329, which is entitled "Operating Mode Transitions based on Advertising Information," by inventors Craig P. Dooley, Akshay Mangalam, Srivatsa, Anjali S. Sandesara, and Michael J. Giles, filed on 2 Sep. 2014, and the contents of which are incorporated herein by reference.

The instant application is also related to pending U.S. patent application Ser. No. 14/474,466, which is entitled "Predefined Wireless Pairing," by inventors Jason C. Conn, Akshay Mangalam Srivatsa, Craig P. Dooley and Michael J. Giles, filed on 2 Sep. 2014, and the contents of which are incorporated herein by reference.

BACKGROUND

Field

The disclosed embodiments relate to electronic devices. More specifically, the disclosed embodiments relate to activity cooperation between electronic devices.

Related Art

Recent advances in computer technology have enabled manufacturers to produce powerful computing devices in various form factors, thereby enabling users to use a device as small and portable as a smartphone or a tablet to perform tasks that once required a desktop or laptop computer. Because of these advances, users often possess and use multiple computing devices, e.g., a smartphone while on the road, a tablet in meetings, and a laptop or desktop computer at a desk.

Although a user may possess different devices, each with powerful computing capabilities, in certain cases, the user may find him- or herself using a device that is ill-suited for a task being performed or for the situation that the user is in. For example, the user may need to enter data at a device that does not have a keyboard or touch screen, whereas other devices the user possesses may provide a virtual and/or physical keyboard. As another example, the user may be viewing a presentation or playing a game on a device that lacks easily manipulated controls for controlling the viewing of the presentation or the playing of the game.

BRIEF DESCRIPTION OF THE FIGURES

In the figures, like reference numerals refer to the same figure elements.

DETAILED DESCRIPTION

Figure 1:
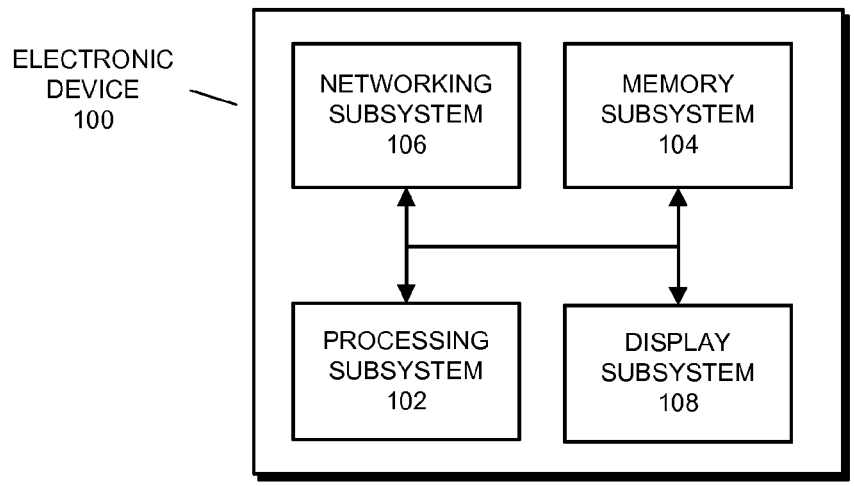
FIG. 1 presents a block diagram illustrating an electronic device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, an electronic device (e.g., electronic device 100 in FIG. 1 and/or some portion thereof) uses code and/or data stored on a computer-readable storage medium to perform some or all of the operations herein described. More specifically, the electronic device reads the code and/or data from the computer-readable storage medium and executes the code and/or uses the data when performing the described operations. In these embodiments, a computer-readable storage medium can be any device or medium or combination thereof that stores code and/or data for use by an electronic device. For example, the computer-readable storage medium can include, but is not limited to, volatile memory or non-volatile memory, such as semiconductor memories (e.g., flash memory, random access memory (eDRAM, RAM, SRAM, DRAM, DDR, DDR2/DDR3/DDR4 SDRAM, etc.), etc.) and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In this description, functional blocks may be referred to in describing some embodiments. Generally, functional blocks include one or more interrelated circuits, devices, and/or mechanisms that perform described operations. In some embodiments, at least some of the functional blocks include general-purpose processing circuits that execute program code (e.g., microcode, firmware, applications, etc.) that causes the general-purpose processing circuits to perform the described operations.

Overview

The described embodiments perform an activity at a source electronic device by cooperating with a companion application at a companion electronic device—a process that is referred to as "augmenting" the activity at the source electronic device. In some embodiments, the activity includes one or more operations that are performed at least partially at the source electronic device that are augmented using controller data from the companion electronic device. Examples of activities include reading and/or editing a document (e.g., a word processing document, spreadsheet, presentation, drawing, or other type of document), composing an email message, an email, voice message or video, drafting a note, accessing (browsing) a website, playing a movie, audio file, and/or game, recording a movie and/or an audio file, or otherwise using an application or app to perform corresponding operations.

In some embodiments, to augment an activity at the source electronic device using the companion electronic device, the source electronic device first broadcasts a controller advertisement message (also referred to as a "controller advertisement") using a wireless network interface (e.g., Bluetooth low energy (BLE), ZigBee, etc.). In these embodiments, the source electronic device includes in the controller advertisement message a controller identifier that indicates a controller from which a first application at the source electronic device is seeking controller data. Examples of controller identifiers are described in more detail below with reference to FIG. 12.

The companion electronic device monitors a network (e.g., a Bluetooth low energy network) for controller advertisement messages on a network interface corresponding to the network interface in the source electronic device from which the controller advertisement message was broadcast. Upon receiving the controller advertisement message broadcast from the source electronic device, the companion electronic device compares the controller identifier in the controller advertisement message to controller identifiers for controllers that are available at the companion electronic device. As part of the comparison, the companion electronic device determines whether a second application, i.e., a companion application, that can provide the controller data sought by the first application is available at the companion electronic device.

In some embodiments, upon determining that the above-described companion application is available, the companion electronic device establishes communication with the source electronic device over a cooperative-activity communication channel (using the same wireless network interface used to receive the controller advertisement message or a different network interface). The companion electronic device then uses the cooperative-activity communication channel to acquire activity data for the activity performed in the first application from the source electronic device. In some embodiments, the companion electronic device uses the controller identifier and/or the activity data to configure the companion application to perform a helper activity for providing the controller data. For example, activity data can include information for accessing a document related to the activity performed in the first application, e.g., a document identifier, document data, a scroll position, a uniform resource locator (URL), etc. In some embodiments, the activity data represents data to be displayed by the companion application on a display of the companion electronic device, e.g., information representing a video stream and/or an image, commands to generate a user interface, and/or data to be displayed at a user interface.

In some embodiments, the companion electronic device starts performing the helper activity in the companion application. While performing the helper activity, the companion electronic device sends controller data obtained in the companion application to the source electronic device. The source electronic device uses some or all of the controller data to perform the activity in the first application at the source electronic device. For example, after the companion electronic device configures the companion application, a user can use a keyboard for the companion electronic device to provide keystrokes/keypresses to the source electronic device, a touch screen for the companion electronic device to move a cursor or draw a shape at the source electronic device, a game controller and/or an accelerometer for the companion electronic device to control a game at the source electronic device, etc.

By performing the operations described above for augmenting an activity performed at the source electronic device by using controller data from the companion electronic device, the described embodiments enable a user to use a controller at the companion electronic device (and/or to use the companion electronic device as a controller) to perform a task at the source electronic device seamlessly and without complex user intervention. This enables the user to more easily perform tasks on desired electronic devices, which can improve the user's overall experience with two or more electronic devices.

Electronic Device

FIG. 1 presents a block diagram illustrating electronic device 100 in accordance with some embodiments. Electronic device 100 includes processing subsystem 102, memory subsystem 104, networking subsystem 106, and display subsystem 108.

Processing subsystem 102 is a functional block that performs computational operations in electronic device 100. Processing subsystem 102 includes one or more central processing units (CPUs)/CPU cores, graphics processing units (GPUs)/GPU cores, embedded processors, application specific integrated circuits (ASICs), and/or other computational mechanisms.

Memory subsystem 104 is a functional block that stores data and/or instructions for use by other functional blocks in electronic device 100 (e.g., processing subsystem 102, etc.). Memory subsystem 104 includes volatile memory circuits such as dynamic random access memory (DRAM), static random access memory (SRAM), and/or other types of memory that are used for storing the instructions and data, as well as mechanisms for controlling the memory circuits. In some embodiments, memory subsystem 104 includes a memory hierarchy with one or more caches coupled to the memory circuits. In some of these embodiments, processing subsystem 102 also includes one or more caches that are part of the memory hierarchy.

In some embodiments, memory subsystem 104 is coupled to one or more non-volatile high-capacity mass-storage devices (not shown). For example, memory subsystem 104 can be coupled to a magnetic or optical drive, a solid-state drive, or another type of mass-storage device. In these embodiments, memory subsystem 104 can be used by electronic device 100 as fast-access storage for often-used data, while the mass-storage device is used to store less frequently used data.

Networking subsystem 106 is a functional block that includes one or more devices configured to couple to and communicate on a wired and/or wireless network (i.e., to perform network operations). For example, networking subsystem 106 can include a Bluetooth™ networking system, a cellular networking system (e.g., a 3G/4G network such as UMTS, LTE, etc.), a universal serial bus (USB) networking system, a networking system based on the standards described in IEEE 802.11, 802.15, etc. (e.g., a ZigBee or Wi-Fi networking system, etc.), an Ethernet networking system, and/or another networking system. Networking subsystem 106 includes processors, controllers, radios/antennas, sockets/plugs, and/or other devices used for coupling to, communicating on, and handling data and events for each supported networking system. In the following description, the mechanisms used for coupling to, communicating on, and handling data and events on the network for each network system are referred to collectively as the "interface" or "network interface" for the network system.

Display subsystem 108 is a functional block that includes one or more devices configured to display information on a visual interface for electronic device 100. For example, in some embodiments, display subsystem 108 includes graphics processors (GPUs), graphics cards, and/or display screens that are used for displaying the information.

In some embodiments, communication paths (that include one or more buses, wires, and/or connections) are coupled between the functional blocks in electronic device 100 (processing subsystem 102, memory subsystem 104, etc.), as shown by arrow-headed lines between the elements. The communication paths are used to transmit commands, data, event notifications, and/or other information between the elements.

Although specific components are used to describe electronic device 100, in some embodiments, different components and/or subsystems may be present in electronic device 100. For example, electronic device 100 may include one or more additional processing subsystems 102, memory subsystems 104, etc. Additionally, one or more of the subsystems may not be present in electronic device 100 or some or all of the subsystem's functions may be incorporated in the other subsystems. Moreover, in some embodiments, electronic device 100 may include one or more additional subsystems that are not shown in FIG. 1. For example, electronic device 100 can include, but is not limited to, a data collection subsystem, an audio and/or video subsystem, an alarm subsystem, a media processing subsystem, and/or an input/output (I/O) subsystem.

Electronic device 100 can be, or can be included in, any device that performs computational operations. For example, electronic device 100 can be, or can be included in, a desktop computer, a laptop computer, a wearable computing device, a tablet computer, a smart phone, a server, a network appliance, a toy, audio-visual equipment (e.g., a receiver, set top box, Apple TV, etc.), automobiles (e.g., a car interface system, navigation system, heads-up display system, etc.), home appliances, controllers, etc., and/or combinations thereof. (Apple TV is a registered trademark of Apple Inc. of Cupertino, Calif.).

Network Environment

Figure 2:
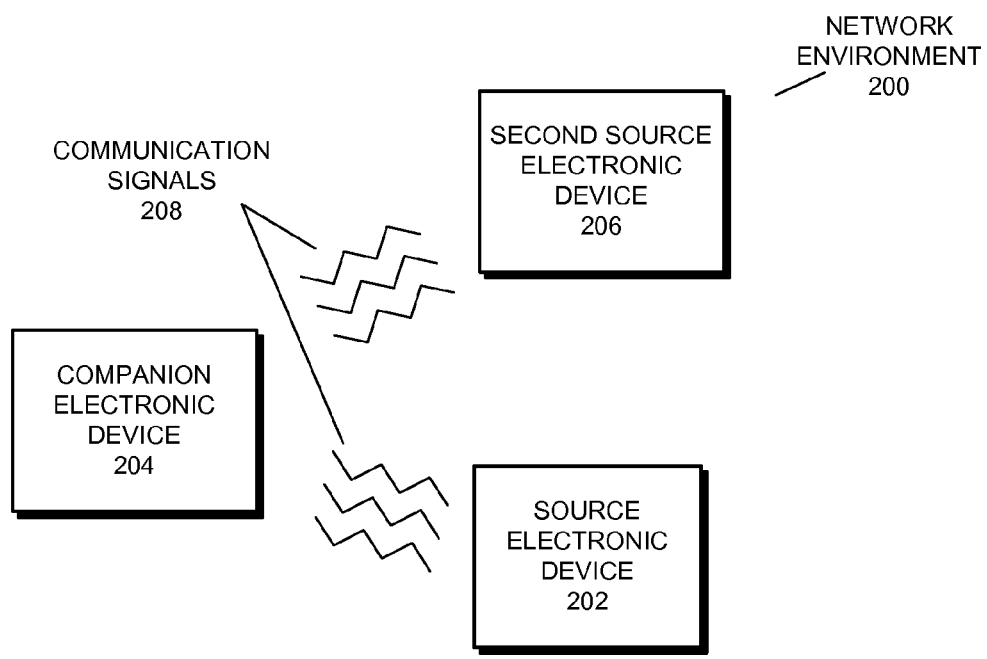
FIG. 2 presents a block diagram illustrating a network environment in accordance with some embodiments.

FIG. 2 presents a block diagram illustrating a network environment in accordance with some embodiments. As can be seen in FIG. 2, network environment 200 includes source electronic device 202, companion electronic device 204, and second source electronic device 206 (referred to collectively as "the electronic devices"). In some embodiments, each of the electronic devices is an electronic device similar to electronic device 100, i.e., has similar subsystems to electronic device 100. However, this is not required; the described embodiments can use any electronic devices that can perform the operations herein described.

Source electronic device 202 and second source electronic device 206 are electronic devices that participate in exchanges of communications with companion electronic device 204 relating to activity augmentation operations. In some embodiments, source electronic device 202 (and/or second source electronic device 206) is an electronic device that is recognized by companion electronic device 204 and therefore is allowed to participate in an activity augmentation operation. For example, both source electronic device 202 and companion electronic device 204 may have been registered with a service provider using the same account and may therefore recognize each other via information stored in each electronic device. For example, in some embodiments, source electronic device 202 and companion electronic device 204 participate in (and recognize each other via information acquired through) a preliminary pairing operation, e.g., a predefined pairing, as described in pending U.S. patent application No. 62/005,751, which is titled "Predefined Wireless Pairing," by inventors Jason C. Conn, Akshay Mangalam Srivatsa, Craig P. Dooley, and Michael Giles, filed on the same day as the instant application, and the contents of which are incorporated by reference as described above. In some embodiments, source electronic device 202 and companion electronic device 204 may participate in a device-to-device exchange of identification factors (encryption keys, certificates, etc.) so that source electronic device 202 and companion electronic device 204 subsequently recognize each other.

Within network environment 200, companion electronic device 204 can communicate with source electronic device 202 and second source electronic device 206 using wireless communication signals 208 (illustrated using jagged lines labeled "COMMUNICATION SIGNALS 208" in FIG. 2). In some embodiments, communication signals 208 are formatted and exchanged (broadcast, transmitted/received, etc.) in accordance with one or more corresponding wireless protocols—for example, via a wireless network protocol such as Bluetooth, ZigBee, an 802.11-based protocol and/or other wireless network protocols. In some embodiments, some or all of communication signals 208 are communicated as wired communication signals, e.g., signals in wired Ethernet, a wired LAN, a wired WAN, etc.

In some embodiments, the operations for augmenting an activity described herein rely on source electronic device 202 and companion electronic device 204 being sufficiently close to each other to enable communication signals 208 (and thus the incorporated messages) sent by each electronic device to be received by the other electronic device. In other words, source electronic device 202 and companion electronic device 204 are in "proximity" to one another, thereby enabling the exchange of messages between the electronic devices. "Proximity" as used herein therefore represents distance(s) at which messages broadcast/sent from a given electronic device can be received by one or more other electronic devices. This distance is dictated by radio equipment (antennas, receivers/transmitters, etc.) in the electronic devices and the particular radio protocol/signals used to broadcast/send the messages, as limited by factors such as environmental conditions (electromagnetic interference, etc.), intermediate objects (furniture, walls, clothing/bags, etc.), etc. For example, in some embodiments, communication signals 208 are exchanged between source electronic device 202 and companion electronic device 204 using a protocol with an expected range of 30 meters, and thus the devices are "in proximity" when the devices are within 30 meters of one another (note, however, that the expected range may be significantly altered by the above-described factors).

Figure 16:
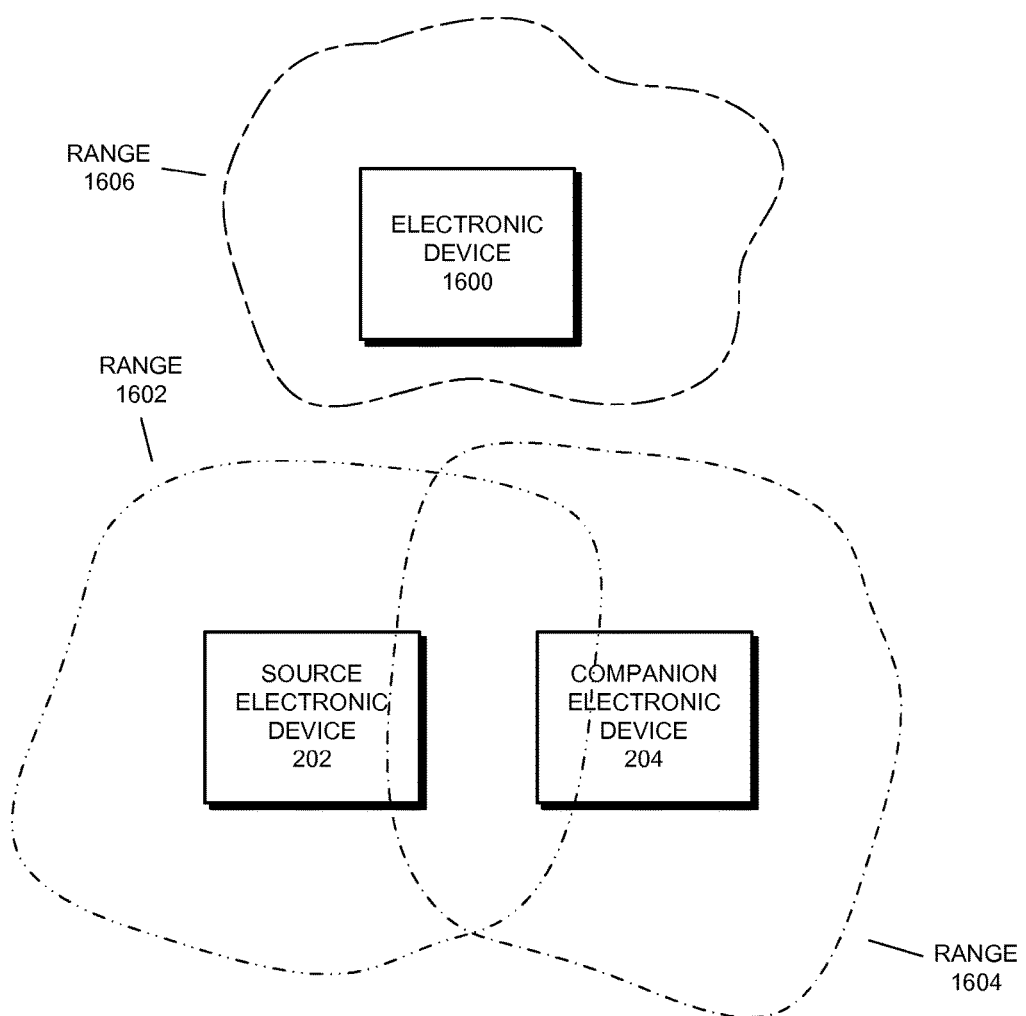
FIG. 16 presents a block diagram illustrating electronic devices in proximity to one another in accordance with some embodiments.

FIG. 16 presents a block diagram illustrating electronic devices in proximity to one another in accordance with some embodiments. As can be seen in FIG. 16, companion electronic device 204 is within range 1602 for radio signals (e.g., communication signals 208) for source electronic device 202, meaning that companion electronic device 204 can receive radio signals sent from source electronic device 202. In addition, source electronic device 202 is within range 1604 for radio signals (e.g., communication signals 208) for companion electronic device 204, meaning that source electronic device 202 can receive radio signals sent from companion electronic device 204. As described above, therefore, source electronic device 202 and companion electronic device 204 are "in proximity" to one another, thereby enabling the communication of messages (and corresponding operations) herein described. However, neither source electronic device 202 nor companion electronic device 204 is within range 1606 for radio signals for electronic device 1600, meaning that neither source electronic device 202 nor companion electronic device 204 is in proximity to electronic device 1600. Note that ranges 1602-1606 in FIG. 16 are shown using irregular shapes, thereby illustrating that radio signals from the electronic devices have irregular ranges, depending on the electronic device (antenna arrangement, etc.), the above-described factors, etc.

In some embodiments, the messages, data, etc. communicated between the electronic devices are encrypted. In these embodiments, some or all of the electronic devices perform corresponding encryption and decryption operations, e.g., by using a shared key, keys derived from a shared key, and/or a one-time key. For example, as described earlier, in some embodiments, source electronic device 202 and companion electronic device 204 participate in a predefined pairing as described in pending U.S. patent application No. 62/005,751, which is titled "Predefined Wireless Pairing," by inventors Jason C. Conn, Akshay Mangalam Srivatsa, Craig P. Dooley, and Michael Giles, filed on the same day as the instant application, and the contents of which are incorporated by reference as described above. In some embodiments, source electronic device 202 and companion electronic device 204 encrypt and decrypt messages exchanged for activity cooperation operations (i.e., operations for augmenting an activity) by using one or more encryption keys that source electronic device 202 and companion electronic device 204 acquire while participating in the predefined pairing.

Although various electronic devices are shown in FIG. 2, in some embodiments different arrangements of electronic devices are used to perform some or all of the operations herein described. For example, in some embodiments, second source electronic device 206 is not present. Generally, the described embodiments include sufficient devices to augment an activity performed at an electronic device as described herein.

Broadcasting a Controller Advertisement Message

Figure 3:
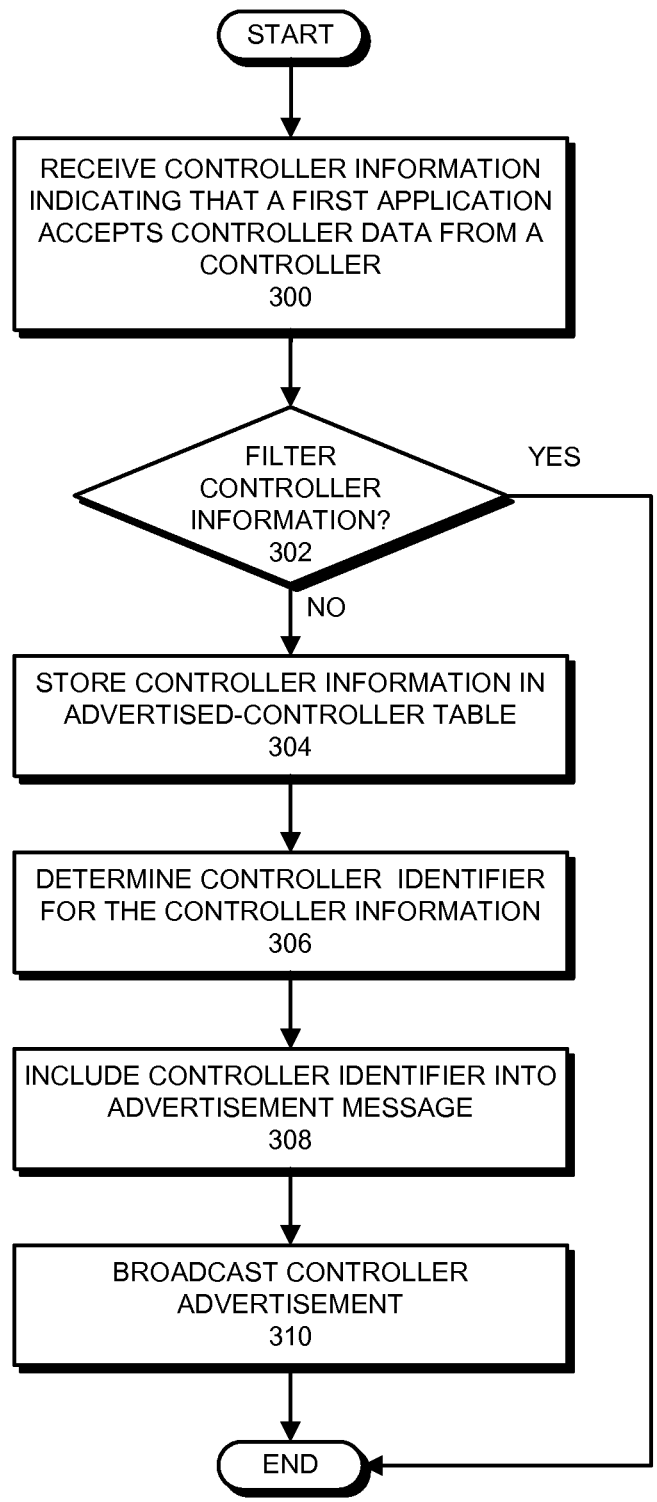
FIG. 3 presents a flowchart illustrating a process for broadcasting a controller advertisement message in accordance with some embodiments.

FIG. 3 presents a flowchart illustrating a process for broadcasting a controller advertisement message in accordance with some embodiments. More specifically, during the process shown in FIG. 3, an electronic device such as source electronic device 202 broadcasts a controller advertisement, i.e., a controller advertisement message. Note that the operations shown in FIG. 3 are presented as a general example of operations performed by some embodiments. The operations performed by some embodiments include different operations and/or operations that are performed in a different order. Additionally, although certain mechanisms are used in describing the operations (e.g., source electronic device 202, etc.), in some embodiments, other mechanisms perform the operations. For example, one or both of companion electronic device 204 and second source electronic device 206 may perform similar operations to broadcast a controller advertisement message for themselves.

The process shown in FIG. 3 starts when source electronic device 202 receives controller information indicating that a first application at source electronic device 202 accepts controller data from a controller (step 300). (Examples of controller information are described in more detail below with reference to FIG. 11). Note that, generally, the first application is installed on/available at source electronic device 202. In some embodiments, the first application provides or reports the controller information to source electronic device 202. In some embodiments, source electronic device 202 queries the first application for the controller information. In some embodiments, the first application is at least a portion of an operating system at source electronic device 202, e.g., an operating system process/service, a device driver, etc. Generally, controller information describes a controller that the first application accepts controller data from that may be used to augment the activity performed in the first application at source electronic device 202. For example, in some embodiments the controller information indicates that the first application accepts data from a keyboard, a touch screen, a game controller, an accelerometer, a remote control, a thumbprint reader, a microphone, a camera, a network controller (e.g., a network controller than receives data from a cellular antenna), etc. In some embodiments, the controller information identifies the first application and/or the activity performed in the first application, e.g., includes a name of the first application and/or the activity performed in the first application that may be augmented with the controller data.

Next, source electronic device 202 determines whether to filter the received controller information (step 302), which includes using one or more criteria to discard controller information that is not to undergo further processing and/or not to be broadcast in a controller advertisement message. For example, source electronic device 202 may measure a frequency at which the first application provides updates to controller information, and may discard controller information from the first application when the frequency at which the controller information is updated exceeds a threshold (which may be referred to as "throttling" the controller information from the first application). As another example, source electronic device 202 may discard controller information that is duplicative or repetitive, that reports facts already known by source electronic device 202, etc. As yet another example, in some embodiments, source electronic device 202 filters the controller information based on an indication that controller information for the activity performed in the first application is not to be advertised. For example, in some embodiments, source electronic device 202 and/or a user of source electronic device 202 may configure certain activities and/or certain kinds of activities as activities that are not to advertise controller information. As yet another example, in some embodiments, source electronic device 202 ranks some or all activities for which controller information exists (i.e., some or all of the activities for which controller information can be advertised) and discards controller information for one or more of these activities based on the ranking. For example, source electronic device 202 can assign a higher ranking to activities that a user has previously chosen to augment and a lower ranking to activities that a user has previously chosen not to augment. In some of these embodiments, source electronic device 202 uses messages from companion electronic device 204 (e.g., messages such as those discussed below with reference to FIG. 5A, step 510) to determine which activities the user chose to augment and which activities the user chose not to augment.

If source electronic device 202 filters, e.g., discards, the controller information (step 302, yes), the process ends. Otherwise, if source electronic device 202 does not filter the controller information (step 302, no), source electronic device 202 stores some or all of the controller information in a structure (step 304). For illustrative purposes, we describe embodiments that store the controller information in an entry in a table, which we will refer to as the "advertised-controller" table. Note, however, that embodiments are not limited to using a table for storing controller information. Some embodiments use a different storage mechanism/structure for storing the controller information, such as an associative array, a content-addressable memory, etc.

In some embodiments, while storing the controller information, source electronic device 202 overwrites and/or removes controller information previously stored in the advertised-controller table. For example, source electronic device 202 can use a least-recently-used (LRU) algorithm to overwrite and/or remove entries from the advertised-controller table. In some embodiments, when the advertised-controller table reaches a predetermined size, source electronic device 202 stores subsequent controller information in a different advertised-controller table, i.e., source electronic device 202 maintains more than one advertised-controller table. Examples of advertised-controller tables are described in more detail below with reference to FIG. 12.

Next, source electronic device 202 generates a controller identifier based on the controller information (step 306). Generally, the controller identifier includes information from the controller information that describes (and/or identifies) a controller that the first application accepts controller data from to augment the activity performed in the first application at source electronic device 202. In some embodiments, source electronic device 202 generates the controller identifier by reducing the controller information into a smaller, encoded representation that can be broadcast more efficiently than the full controller information. In some of these embodiments, the encoded representation is a hash of the controller information, i.e., the output of a hash function (e.g., MD4, MD5, SHA, MurmurHash, etc.) whose input comprises some or the entire controller information. In some embodiments, source electronic device 202 stores the controller identifier along with the controller information in the advertised-controller table (or whatever structure source electronic device 202 uses to store the controller information). Examples of controller identifiers are described in more detail below with reference to FIG. 12.

In some embodiments, the controller identifier comprises a representation of a domain name. For example, in some embodiments, when the activity performed in the first application includes using a resource at a domain, the controller information comprises a domain name, e.g., at least a portion of a uniform resource locator (URL) that source electronic device 202 uses to access the resource at the domain. In some embodiments, source electronic device 202 determines the controller identifier by including some or all of the domain name in the controller identifier. For example, the controller identifier can be a hash of some or all of the URL for the resource.

In some embodiments, the controller identifier identifies an entry in a structure where source electronic device 202 stored the controller information (e.g., as described above with reference to step 304). For example, in embodiments that maintain more than one advertised-controller table, the controller identifier can identify the entry in an advertised-controller table where source electronic device 202 stored the controller information. The controller identifier can also identify the advertised-controller table itself. In some embodiments, to identify the entry in the advertised-controller table where source electronic device 202 stored the controller information, the controller identifier includes: (1) a hash of the data in the advertised-controller table to identify the advertised-controller table, and (2) an index identifying the entry in the advertised-controller table where the controller information is stored.

Figure 13:
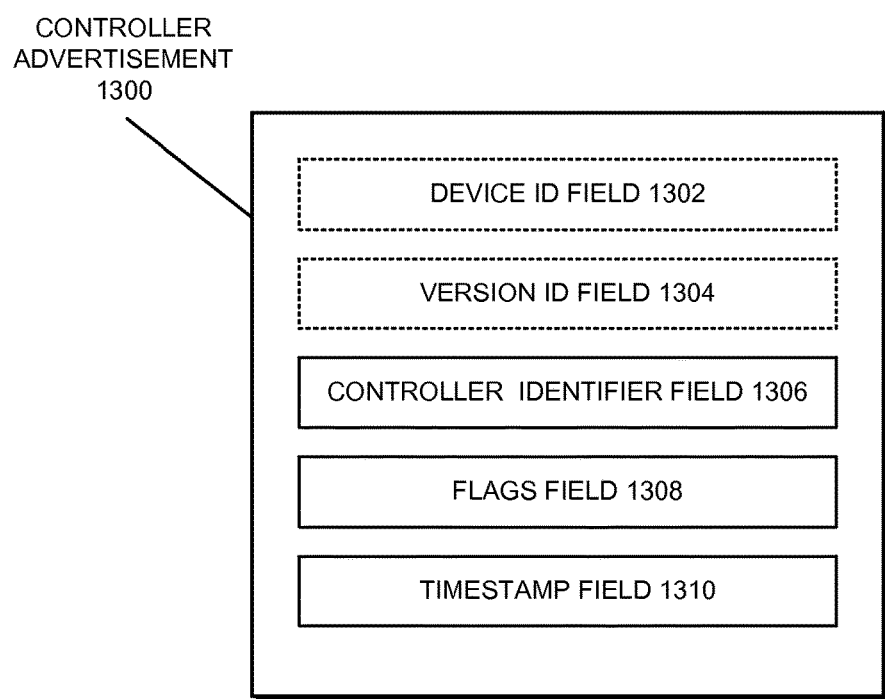
FIG. 13 presents a block diagram illustrating a controller advertisement message in accordance with some embodiments.

Next, source electronic device 202 includes the controller identifier into a controller advertisement message (step 308), e.g., by generating a controller advertisement message that includes the controller identifier. For example, source electronic device 202 may generate a packet formatted in accordance with a protocol used to broadcast the controller advertisement message, e.g., a packet such as shown in FIG. 13.

In some embodiments, the controller advertisement message includes other data in addition to the controller identifier. For example, in some embodiments, the controller advertisement message includes a flag that is used to indicate when the controller identifier includes a representation of domain name for an online resource related to the activity. In these embodiments, source electronic device 202 asserts the flag (e.g., sets the flag to a predetermined value such as 1) to indicate that the controller identifier includes a representation of a domain name. In some embodiments, source electronic device 202 asserts a flag in the controller advertisement message to indicate that source electronic device 202 will separately provide data for the helper activity to companion electronic device 204, e.g., by source electronic device 202 including corresponding instructions in the activity data (activity data is described in more detail below). In some embodiments, source electronic device 202 asserts a flag in the controller advertisement message that identifies the controller (e.g., the type of controller) that the first application accepts controller data from, e.g., a flag that indicates whether the first application accepts controller data from a keyboard, game controller, microphone, etc. Flags are described in more detail below.

In some embodiments, the controller advertisement message includes a timestamp, which can express an absolute or a relative time. In some embodiments, the timestamp indicates the time since the activity performed in the first application was last performed, e.g., the last time that a document was edited, a website was accessed, a movie watched, a game played, etc. In some embodiments the timestamp is independent of the activity, i.e., the timestamp indicates the time that a user last interacted with source electronic device 202, regardless of whether the user's last interaction included the user performing the activity and/or using the first application.

Next, source electronic device 202 broadcasts (advertises) the controller advertisement message (step 310). For example, source electronic device 202 can broadcast the controller advertisement message using communication signals 208. In some embodiments, source electronic device 202 broadcasts/advertises the controller advertisement message in network environment 200 so that nearby devices in network environment 200 can receive the controller advertisement message. For example, in these embodiments, source electronic device 202 uses a Bluetooth™ communication channel such as Bluetooth Low Energy (BLE) to broadcast the controller advertisement message. Some embodiments may broadcast the controller advertisement message on a different communication channel/network interface, such as a peer-to-peer network, a LAN, the Internet, etc. Note that controller advertisement message broadcasts can happen more than once, e.g., source electronic device 202 can broadcast the same controller advertisement message multiple times and/or periodically.

Available-Controller Table

In some embodiments, companion electronic device 204 stores available controller information, e.g., controller information describing controllers that are available at companion electronic device 204 and/or applications that are available at companion electronic device 204 to provide controller data from corresponding controllers (examples of controller information are described in more detail below with reference to FIG. 11). For example, in some embodiments, companion electronic device 204 stores controller identifiers for the available controller information. For illustrative purposes, we describe companion electronic device 204 storing the available controller information in a table, which we refer to as the "available-controller" table (examples of available-controller tables are described in more detail later in this disclosure). Note that, although we describe embodiments that store available controller information in an available-controller table, embodiments are not limited to using a table for storing the available controller information. Some embodiments can use other structures for storing the available controller information, such as an associative array, a content-addressable memory, etc.

Figure 4:
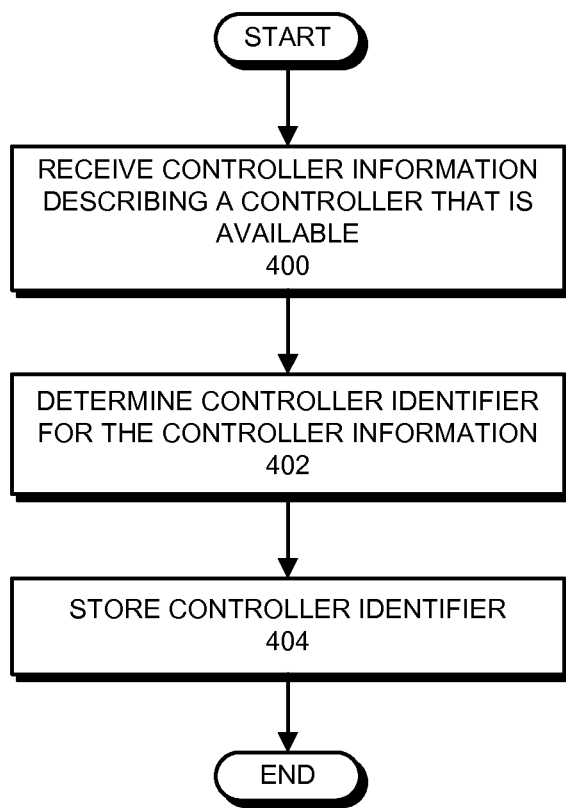
FIG. 4 presents a flowchart illustrating a process for storing available controller information into an available-controller table in accordance with some embodiments.

FIG. 4 presents a flowchart illustrating a process for storing available controller information into an available-controller table in accordance with some embodiments. Note that the operations shown in FIG. 4 are presented as a general example of operations performed by some embodiments. The operations performed by some embodiments include different operations and/or operations that are performed in a different order. Additionally, although certain mechanisms are used in describing the operations (e.g., companion electronic device 204, etc.), in some embodiments, other mechanisms perform the operations. For example, one or both of source electronic device 202 and second source electronic device 206 may perform similar operations to store available controller information for themselves.

The process shown in FIG. 4 starts when companion electronic device 204 receives controller information describing a controller that is available via a second application, e.g., a companion application, at companion electronic device 204 (step 400), e.g., controller information describing a controller for which the second application can provide controller data. Generally, the controller information describes an operation or function that the second application at companion electronic device 204 is able to perform to provide the controller data. For example, in some embodiments the controller information includes a name of the second application and/or a controller descriptor, e.g., GameController, SlideshowRemote, etc. (controller information is described in more detail below with reference to FIG. 11). In some embodiments, the second application reports/provides the controller information as the second application is installed and/or used. In some embodiments, companion electronic device 204 queries or otherwise monitors the second application to collect the controller information. In some embodiments, the controller information includes controller information describing controllers that applications that have not been performed at companion electronic device 204, but that are available to be performed, can provide (e.g., controller information reported by the second application as the second application is installed/ updated, launched, used, etc. at companion electronic device 204).

Next, companion electronic device 204 determines a controller identifier based on the controller information for the second application (step 402), i.e., based on the controller information received at step 400. Generally, the controller identifier identifies the second application and/or describes the controller for which the second application is able to provide controller data. In some embodiments, the controller identifier is an encoded representation of the controller information for the second application. In some embodiments, companion electronic device 204 determines the controller identifier by performing some or all of the same operations that source electronic device 202 performs to generate the controller identifier for the first application (see FIG. 3, step 306). For example, in some embodiments, companion electronic device 204 uses the same hash function to generate the controller identifier for the second application that source electronic device 202 uses to generate the controller identifier for the first application.

In some embodiments, when the second application can provide controller data by performing an activity that includes accessing a resource at a domain, the controller information for this activity includes a domain name for the domain. In some of these embodiments, the second controller identifier is an encoded representation of the domain name, which enables the second application to "claim" the domain name, i.e., to declare that the second application can use resources at the domain name so that companion electronic device 204 can provide controller data by using the second application. For example, as will be described later, in a scenario where the second application streams movies from a specific site on the Internet, the second controller identifier can be an encoded representation of at least some part of the domain name for the site. Note that the second application can be different from the first application, i.e., the application for which controller information is advertised in the controller advertisement message.

Next, companion electronic device 204 stores the second controller identifier into the available-controller table (step 404).

Figure 5A:
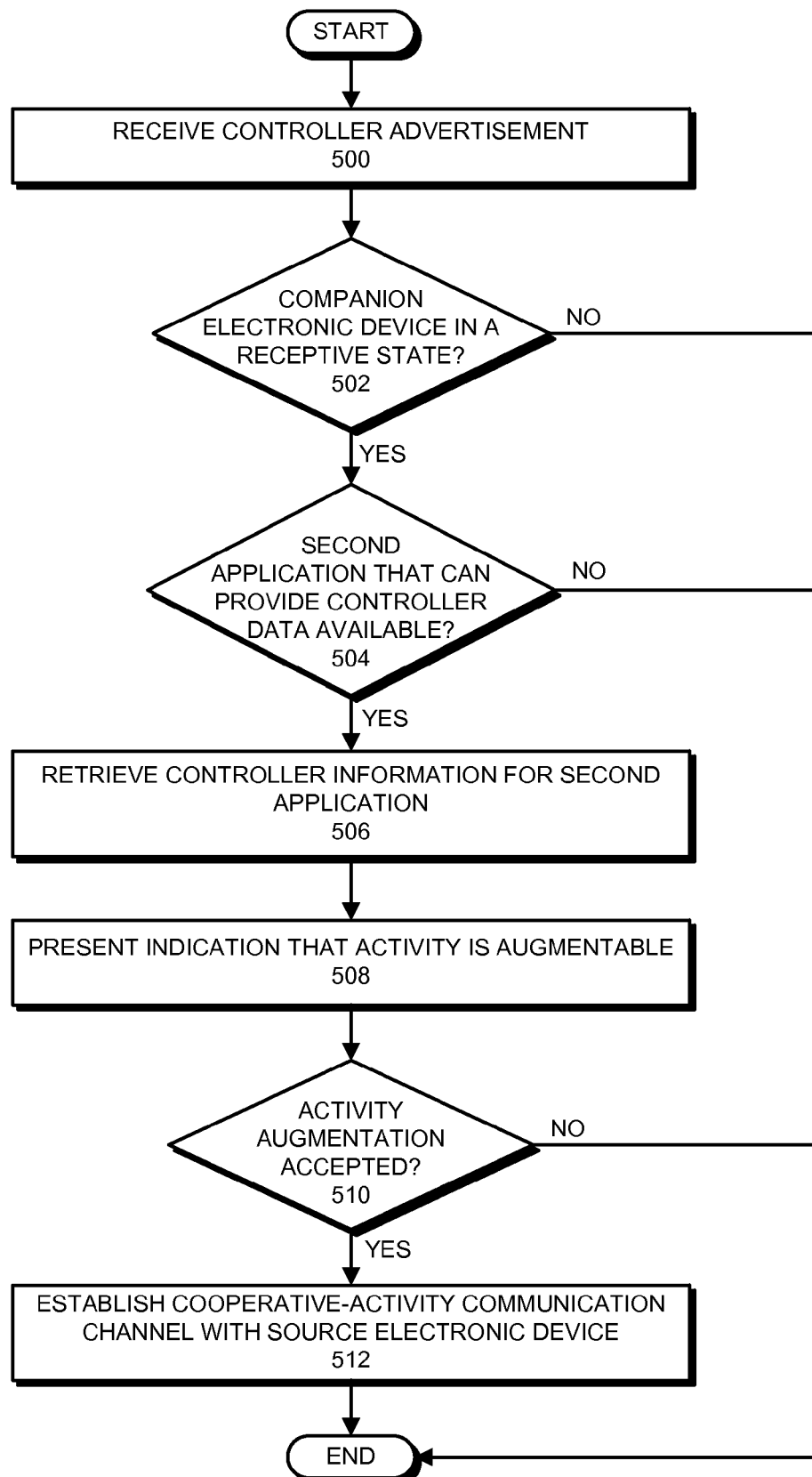
FIG. 5A presents a flowchart illustrating a process for establishing a cooperative-activity communication channel with an electronic device that broadcasts a controller advertisement message in accordance with some embodiments.

Establishing a Cooperative-Activity Communication Channel at the Companion Electronic Device In some embodiments, upon receiving a controller advertisement message, an electronic device (i.e., a companion electronic device) establishes a cooperative-activity communication channel with an electronic device that broadcast the controller advertisement message (i.e., a source electronic device). FIG. 5A presents a flowchart illustrating a process for establishing a cooperative-activity communication channel with an electronic device that broadcast a controller advertisement message in accordance with some embodiments. More specifically, during the process shown in FIG. 5A, companion electronic device 204 establishes a cooperative-activity communication channel with source electronic device 202. Note that the operations shown in FIG. 5A are presented as a general example of operations performed by some embodiments. The operations performed by some embodiments include different operations and/or operations that are performed in a different order. Additionally, although certain mechanisms are used in describing the operations (e.g., source electronic device 202, companion electronic device 204), in some embodiments, other electronic devices and/or mechanisms perform the operations.

The process shown in FIG. 5A starts when companion electronic device 204 receives a controller advertisement message (step 500), i.e., a controller advertisement message broadcast from source electronic device 202 (see FIG. 3, step 310). Next, companion electronic device 204 determines whether companion electronic device 204 is in a receptive state (step 502). Generally, companion electronic device 204 is in a receptive state when it is available for performing helper activities to provide controller data. For example, in some embodiments, companion electronic device 204 transitions from a non-receptive state to a receptive state when the device "wakes up," e.g., while displaying a lock screen after a user presses a button to wake up the device. In some embodiments, companion electronic device 204 is not in a receptive state (or is in a non-receptive state) when companion electronic device 204 is in use, e.g., when a user is using an application at companion electronic device 204 and/or when the user has used an application within a given period of time.

If companion electronic device 204 is not in a receptive state (step 502, no), the process ends (i.e., the controller advertisement message is ignored by companion electronic device 204). Otherwise, if companion electronic device 204 is in a receptive state (step 502, yes), companion electronic device 204 determines whether a second application that can provide controller data for the controller in the controller advertisement message is available at companion electronic device 204 (step 504). Generally, this operation includes determining if an application is available at companion electronic device 204 that can provide controller data from the controller and/or act as the controller described in the controller advertisement message from source electronic device 202. Determining whether the second application is available is described in more detailed later with reference to FIGS. 7-8.

If the second application is not available (step 504, no), the process ends. Otherwise, if the second application is available (step 504, yes), companion electronic device 204 retrieves controller information for the second application (step 506). For example, as will also be described in more detail with reference to FIGS. 7-8 and 14, after determining the second application, companion electronic device 204 can use the controller identifier for the second application to retrieve controller information from the available-controller table that describes the controller for which the second application can provide controller data (or, companion electronic device 204 can retrieve the controller information from another structure that companion electronic device 204 uses to store available controller information). In some embodiments, companion electronic device 204 uses the retrieved controller information, e.g., uses an application identifier and/or controller descriptor in the retrieved controller information, to customize an indication that the advertised activity is augmentable, e.g., as described below with reference to step 508 and/or FIG. 14. Application identifiers and controller descriptors are described in more detail with reference to FIG. 11.

Next, companion electronic device 204 presents an indication that the activity is augmentable, i.e., an indication that companion electronic device 204 can be used to augment the activity performed at source electronic device 202 (step 508). For example, companion electronic device 204 can present a graphical icon and/or notification in a display of companion electronic device 204. Companion electronic device 204 can determine which icon and/or notification to display based on information in the controller advertisement message and/or the controller information for the second application retrieved at step 506. In some embodiments, the second application provides the graphical icon and/or notification. In some embodiments, e.g., when the controller advertisement message includes one or more asserted flags, companion electronic device 204 selects the graphical icon and/or notification from a set of predetermined icons and/or notifications that each correspond to a controller, e.g., each controller corresponds to a flag that can be asserted in the controller advertisement message. Indications that an activity is augmentable are described in more detail below with reference to FIG. 14.

Then, companion electronic device 204 determines whether activity augmentation was accepted (step 510). In some embodiments, a user of companion electronic device 204 accepts and/or rejects the activity augmentation by performing an action with the indication, such as clicking on the indication, dragging the indication in one or more directions and/or to one or more specific locations, etc. For example, to accept the activity augmentation, a user can tap the icon/notification with a finger (on a touch screen display) and drag the icon/notification in a first direction (e.g., left to right, upward, clockwise in a circle, etc.). As another example, to reject an activity augmentation, a user can tap the icon/notification with a finger and drag the icon/notification in a second direction (e.g., right to left, downward, counterclockwise in a circle, etc.). In some embodiments, companion electronic device 204 determines that the activity augmentation was not accepted based on a time-out period, i.e., by determining that a period of time has passed since the indication was presented without the user performing the action to accept the indication/activity augmentation.

If the activity augmentation is not accepted (step 510, no), the process ends. Note that, in some embodiments, if the activity augmentation is not accepted, companion electronic device 204 sends a message to source electronic device 202 to indicate that the activity augmentation was not accepted. If the activity augmentation is accepted (step 510, yes), companion electronic device 204 establishes a cooperative-activity communication channel with source electronic device 202 (step 512). In some embodiments, at step 512, companion electronic device 204 sends a request to establish the cooperative-activity communication channel to source electronic device 202. In some embodiments, in response to the request, companion electronic device 204 receives a response from source electronic device 202 that includes information that companion electronic device 204 uses to join a cooperative-activity communication channel (information that source electronic device 202 can provide in response to such a request is described in more detail below with reference to FIG. 5B, step 554). In some embodiments, companion electronic device 204 sends the request to establish the cooperative-activity communication channel using the same network interface over which companion electronic device 204 received the controller advertisement message, e.g., a Bluetooth network. In some embodiments, companion electronic device 204 sends the request to establish the cooperative-activity communication channel using a different network interface.

In some embodiments, establishing the cooperative-activity communication channel includes companion electronic device 204 creating the cooperative-activity communication channel and providing network information to source electronic device 202 that source electronic device 202 can use to join the cooperative-activity communication channel. In some embodiments, companion electronic device 204 includes the network information with the request sent at step 512, i.e., the request to establish the cooperative-activity communication channel that companion electronic device 204 sends to source electronic device 202. For example, in some embodiments, companion electronic device 204 determines a network interface, protocol, address, port, wireless channel/frequency, service set identifier (SSID), and/or authentication information (password, encryption keys, etc.) for an existing network that companion electronic device 204 can connect/is connected to (e.g., a wireless and/or wired LAN, such as an 802.11-based network, a wired Ethernet network, etc.). In some of these embodiments, the existing network is provided by a third device such as an access point, etc. In some embodiments, companion electronic device 204 creates a new network (e.g., a peer-to-peer/ad-hoc network, a direct wireless link, a VPN network, etc.), and includes in the network information a network interface, protocol, address, port, wireless channel/frequency, SSID, and/or authentication information (password, encryption keys, etc.) for the new network.

Transitioning to a Receptive State Based on Advertising Information

Although in FIG. 5A we describe embodiments that receive a controller advertisement message (see FIG. 5A, step 500) and determine whether companion electronic device 204 is in a receptive state (see FIG. 5A, step 502), some embodiments transition to a receptive state based on information in received controller advertisement messages. In some of these embodiments, after receiving a controller advertisement message (e.g., as shown in FIG. 5A, step 500), companion electronic device 204 does not determine whether companion electronic device 204 is in a receptive state, i.e., the process shown in FIG. 5A proceeds from step 500 to step 504 without performing operations for step 502.

For example, in some embodiments, source electronic device 202 uses a low-power protocol such as Bluetooth low-energy (BLE), ZigBee, etc. to broadcast the controller advertisement message with corresponding communication signals 208. Devices such as companion electronic device 204 may monitor for controller advertisement messages broadcast from source electronic device 202 using corresponding low-power mechanisms, such as a baseband processor within a corresponding network interface, e.g., a baseband processor in networking subsystem 106. In some of these embodiments, the receiving of the controller advertisement message is handled by companion electronic device 204 using only a baseband processor for companion electronic device 204, which means that companion electronic device 204 may otherwise be in an idle state (e.g., with subsystems such as the processing subsystem in a low-power state). For example, in some embodiments, companion electronic device 204 may be a smart phone in a user's pocket in an idle state in which a baseband processor monitors for controller advertisement messages while the processing subsystem (and companion electronic device 204 generally) is in a low-power state.

In some embodiments, upon recognizing the controller advertisement message as such, the baseband processor wakes the processing subsystem (and may generally transition companion electronic device 204 out of the idle operating state to a higher-power/more active operating state) to perform subsequent operations. For example, in some embodiments, companion electronic device 204 may monitor for controller advertisement messages and react to controller advertisement messages as is described in U.S. patent application Ser. No. 62/005,755, which was filed on the same day as the instant application, which is titled "Operating Mode Transitions based on Advertising Information," by inventors Craig P. Dooley, Akshay Mangalam Srivatsa, Anjali S. Sandesara, and Michael Giles, and which is incorporated by reference as described above. In some embodiments, companion electronic device 204/the smart phone may not need to be retrieved from the user's pocket and activated to place companion electronic device 204 in a receptive state.

Figure 5B:
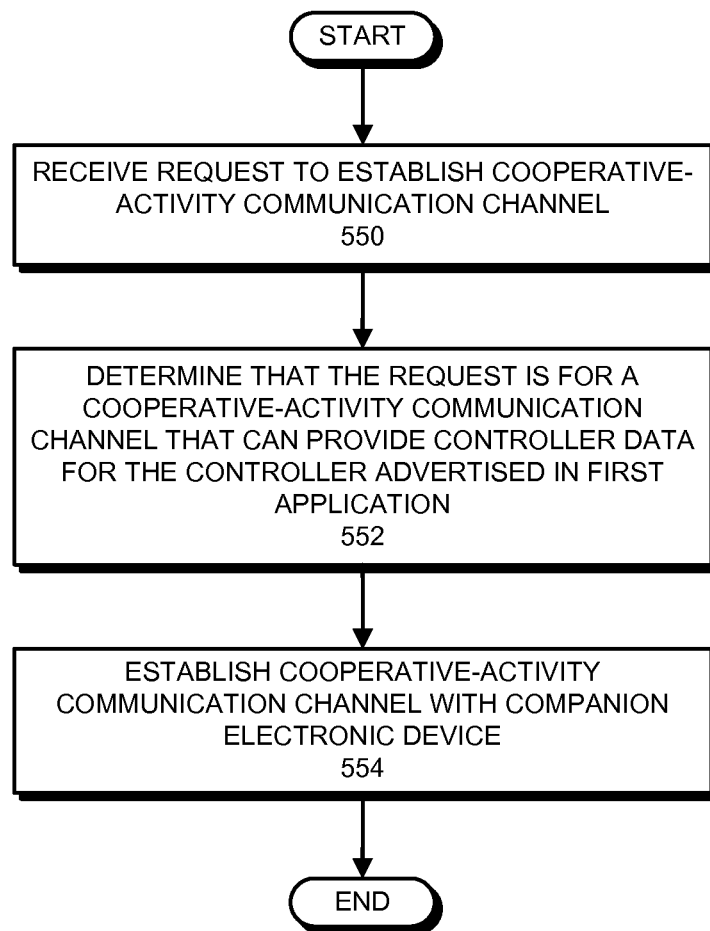
FIG. 5B presents a flowchart illustrating a process for establishing a cooperative-activity communication channel with a device that can provide controller data for a controller advertised in a controller advertisement message in accordance with some embodiments.

Establishing a Cooperative-Activity Communication Channel at the Source Electronic Device In some embodiments, an electronic device that broadcasts a controller advertisement message (i.e., a source electronic device) establishes a cooperative-activity communication channel with an electronic device (i.e., a companion electronic device) that can provide controller data for a controller advertised in the controller advertisement message. FIG. 5B presents a flowchart illustrating a process for establishing a cooperative-activity communication channel with a device that can provide controller data for a controller advertised in a controller advertisement message in accordance with some embodiments. More specifically, during the process shown in FIG. 5B, source electronic device 202 establishes a cooperative-activity communication channel with companion electronic device 204. Note that the operations shown in FIG. 5B are presented as a general example of operations performed by some embodiments. The operations performed by some embodiments include different operations and/or operations that are performed in a different order. Additionally, although certain mechanisms are used in describing the operations (e.g., source electronic device 202), in some embodiments other electronic devices and/or mechanisms perform the operations.

The process shown in FIG. 5B starts when source electronic device 202 receives a request to establish a cooperative-activity communication channel with companion electronic device 204 (step 550). For example, in some embodiments source electronic device 202 receives a request that companion electronic device 204 sends as described in FIG. 5A, step 512.

Next, source electronic device 202 determines that the request is for a cooperative-activity communication channel that can provide controller data for the controller advertised for the first application (step 552). Generally, the request to establish the cooperative-activity communication channel includes information that source electronic device 202 can use to identify the first application. For example, in some embodiments, companion electronic device 204 includes with the request to establish the cooperative-activity communication channel a controller identifier for the first application, e.g., the controller identifier that source electronic device 202 included in the controller advertisement message (as shown in FIG. 3, step 308). In some embodiments, source electronic device 202 performs a lookup for the controller identifier in the advertised-controller table (or other structure where advertised controller information is stored). (Examples of advertised-controller tables are described in more detail below with reference to FIG. 12). When source electronic device 202 finds an entry in the advertised-controller table that includes the controller identifier from the controller advertisement message, source electronic device 202 can retrieve the controller information for the entry to determine that the controller identifier corresponds to the first application. For example, in some embodiments, source electronic device 202 determines that the application identifier stored in the entry is the application identifier for the first application, and/or that the controller descriptor stored in the entry is the controller descriptor for the first application. Examples of application identifiers and controller descriptors are described in more detail with reference to FIG. 11.

Then, source electronic device 202 establishes the cooperative-activity communication channel with companion electronic device 204 (step 554). In some embodiments, source electronic device 202 uses information in the request to establish the cooperative-activity communication channel to join a cooperative-activity communication channel created by companion electronic device 204. For example, source electronic device 202 can join the cooperative-activity communication channel by using network information provided by companion electronic device 204 with the request, e.g., as described earlier with reference to FIG. 5A, step 512.

In some embodiments, source electronic device 202 creates the cooperative-activity communication channel, which includes source electronic device 202 determining network information which companion electronic device 204 can use to join the cooperative-activity communication channel created by source electronic device 202. In some embodiments, source electronic device 202 includes the network information in a response to the request to establish the cooperative-activity communication channel that source electronic device 202 sends to companion electronic device 204, e.g., as described earlier with reference to FIG. 5A, step 512. For example, in some embodiments, the network information that source electronic device 202 determines includes a network interface, protocol, address, port, wireless channel/frequency, service set identifier (SSID), and/or authentication information (password, encryption keys, etc.) for an existing network that source electronic device 202 can connect/is connected to (e.g., a wireless and/or wired LAN, such as an 802.11-based network, a wired Ethernet network, etc.). In some embodiments, companion electronic device 204 creates a new network (e.g., a peer-to-peer/ad-hoc network, a direct wireless link, a VPN network, etc.), and includes in the network information a network interface, protocol, address, port, wireless channel/frequency, SSID, and/or authentication information (password, encryption keys, etc.) for the new network. In some embodiments, source electronic device 202 sends the response to the request to establish the cooperative-activity communication channel using the same network over which source electronic device 202 advertised the controller advertisement message, e.g., a Bluetooth network. In some embodiments, source electronic device 202 sends the response to the request to establish the co-operative communication channel using a different network.

Providing Controller Data for Augmenting an Activity

Figure 6A:
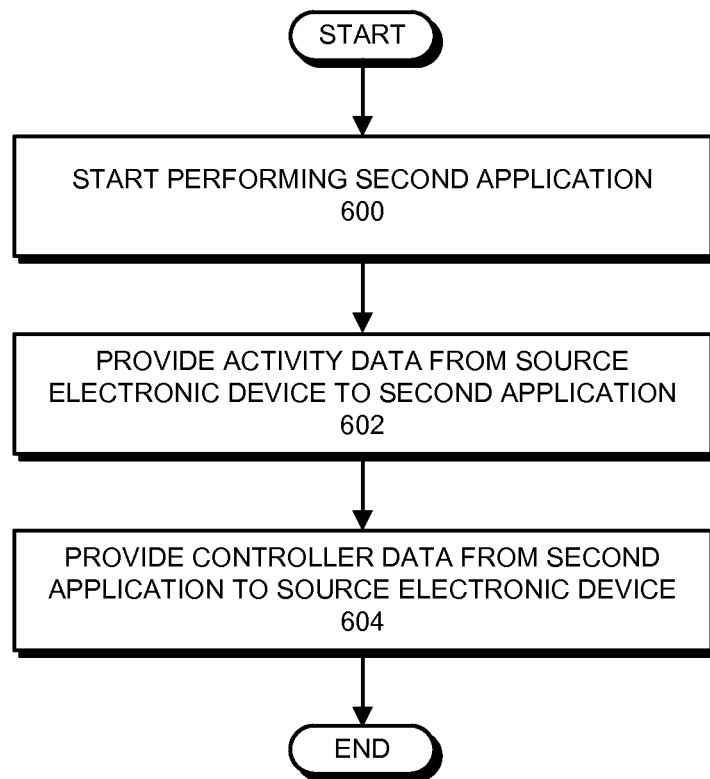
FIG. 6A presents a flowchart illustrating a process for providing controller data for augmenting an activity in accordance with some embodiments.

FIG. 6A presents a flowchart illustrating a process for providing controller data for augmenting an activity in accordance with some embodiments. More specifically, during the process shown in FIG. 6A, companion electronic device 204 provides controller data from a second application to source electronic device 202. Note that the operations shown in FIG. 6A are presented as a general example of operations performed by some embodiments. The operations performed by other embodiments include different operations and/or operations that are performed in a different order. Additionally, although certain mechanisms are used in describing the operations (e.g., companion electronic device 204), in some embodiments other electronic devices and/or mechanisms perform the operations.

The process shown in FIG. 6A starts when companion electronic device 204 starts performing the second application, i.e., the companion application (step 600). For example, companion electronic device 204 may start/launch the second application at companion electronic device 204 (if the second application was not already running). In some embodiments, companion electronic device 204 starts the second application after companion electronic device 204 establishes a cooperative-activity communication channel with source electronic device 202, e.g., as described earlier with reference to FIG. 5A, step 512, and FIG. 5B, step 554. In some embodiments, starting the second application includes configuring the second application to perform a helper activity that can provide controller data for the controller described in the controller advertisement message.

Next, companion electronic device 204 provides activity data received from source electronic device 202 (or information representing the activity data) to the second application (step 602). Generally, companion electronic device 204 receives the activity data from source electronic device 202 using the cooperative-activity communication channel established with source electronic device 202. Activity data includes data that the second application can use to perform the helper activity, i.e., data that the second application can use to perform operations related to providing controller data for the controller described in the controller advertisement message. For example, the activity data may include data that the second application uses to display a user interface at companion electronic device 204 (e.g., graphics data and/or commands). In some embodiments, the activity data includes a document/resource identifier that causes the second application to access to the document/resource (e.g., an identifier for a cloud-stored document for the second application to access from cloud-based storage located on the Internet, an identifier for a document for the second application to access from a database, a URL, etc.), etc. In some embodiments, when the activity performed in the first application includes composing a document that is stored at source electronic device 202, the activity data includes the document or information representing the document, thereby enabling companion electronic device 204 and/or the second application to use/re-create the document at companion electronic device 204 for the second application. In some embodiments, the activity data includes instructions/commands for performing the helper activity at the second application. In some embodiments, the activity data includes position information, e.g., an indication of the last viewed/scrolled position in the document or the web page, the last played position in a video game (e.g., the last level played, coordinates to a place that the player was last at, points and/or achievements earned, and/or information that can be used to recreate the state of a game played on source electronic device 202 at companion electronic device 204), etc.

Companion electronic device 204 then provides controller data received from the second application to source electronic device 202 (step 604). In some embodiments, companion electronic device 204 uses the cooperative-activity communication channel to send the controller data to source electronic device 202 (although, in some embodiments, companion electronic device 204 uses a different communication channel to send the controller data to source electronic device 202). In some embodiments, the second application provides or reports the controller data to companion electronic device 204. For example, in some embodiments, the second application periodically reports controller data (e.g., reports every N seconds, where N is a number such as 1, 3, etc., reports controller data each time an event happens for the second application, such as when a document is updated in the second application, user input is provided in the second application, data is received at the second application from a sensor and/or peripheral for companion electronic device 204, etc.). In some embodiments, companion electronic device 204 queries the second application for the controller data. In some embodiments, the second application is part of an operating system at companion electronic device 204, e.g., an operating system process/service, a device driver, etc.

Generally, the above-described controller data describes, is based on, or otherwise represents actions performed at companion electronic device 204 while using the second application to perform the helper activity. For example, in some embodiments, the second application and/or companion electronic device 204 acts as a controller for the first application at source electronic device 202, e.g., the second application/companion electronic device 204 acts as a keyboard, a touch screen, and/or a game controller. In some embodiments the controller data includes actions/input received at companion electronic device 204 from a keyboard (e.g. keys pressed at a virtual and/or physical keyboard), a touch screen (e.g., coordinates, motions, and/or gestures performed at the touch screen), a game controller (e.g., directional input, button clicks, etc.), an accelerometer, and/or one or more other components capable of receiving user input at companion electronic device 204.

In some embodiments, the controller data includes data received from a sensor, a transducer, and/or a peripheral for companion electronic device 204 (or combinations thereof). For example, in some embodiments the controller data includes authentication data from a thumbprint reader (e.g., fingerprint data), video and/or an image received from a camera, data received from a cellular antenna, sound received from a microphone, and/or data received from one or more other sensors or transducers on companion electronic device 204 (or combinations thereof).

Using Controller Data to Augment an Activity

Figure 6B:
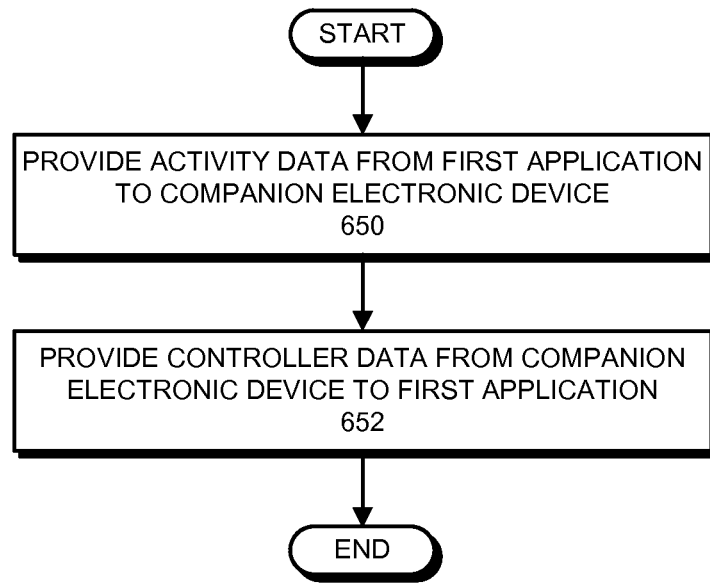
FIG. 6B presents a flowchart illustrating a process for using controller data to augment an activity in accordance with some embodiments.

FIG. 6B presents a flowchart illustrating a process for using controller data to augment an activity in accordance with some embodiments. More specifically, during the process shown in FIG. 6B, source electronic device 202 uses controller data from companion electronic device 204 to augment an activity performed in a first application at source electronic device 202. Note that the operations shown in FIG. 6B are presented as a general example of operations performed by some embodiments. The operations performed by other embodiments include different operations and/or operations that are performed in a different order. Additionally, although certain mechanisms are used in describing the operations (e.g., source electronic device 202), in some embodiments other electronic devices and/or mechanisms perform the operations.

The process shown in FIG. 6B starts when source electronic device 202 provides activity data for an activity performed in a first application at source electronic device 202 to companion electronic device 204 (step 650). In some embodiments, source electronic device 202 provides the activity data after establishing a cooperative-activity communication channel with companion electronic device 204, e.g., as described earlier with reference to FIG. 5B, step 554. In some embodiments, source electronic device 202 transmits the activity data to companion electronic device 204 using the cooperative-activity communication channel (although, in some embodiments, source electronic device 202 uses a different communication channel to transmit the activity data). In some embodiments, the first application provides or reports the controller information to source electronic device 202. For example, in some embodiments, the first application provides some or all of the activity data along with the initial controller information (see FIG. 3, step 300) and/or periodically reports activity data, e.g., reports every N seconds, where N is a number such as 1, 3, etc., reports activity data each time an event happens for the first application, such as when a document is updated in the first application, user input is provided in the first application, etc. In some embodiments, source electronic device 202 queries the first application for the activity data. In some embodiments, the first application is part of an operating system at source electronic device 202, e.g., an operating system process/service, a device driver, etc.

Generally, activity data includes commands, instructions, and/or data related to the activity performed in the first application at source electronic device 202 that a second application, i.e., a companion application, at companion electronic device 204 can use to perform a helper activity to augment the activity performed in the first application at source electronic device 202. For example, the activity data can include graphics data and/or commands that the second application can use to display a user interface at companion electronic device 204, a document/resource identifier that the second application can use to access a document (e.g., an identifier for a cloud-stored document for the second application to access from cloud-based storage located on the Internet, an identifier for a document for the second application to access from a database, a URL, etc.), an indication of the last position that a document and/or web page related to the activity performed in the first application was last viewed at/scrolled to using the first application, a copy of a draft document stored at source electronic device 202 and/or in a storage device accessible on the Internet (e.g., "cloud storage") or a corporate network, etc.

Source electronic device 202 then provides controller data received from companion electronic device 204 (or information representing the controller data) to the first application (step 652), e.g., controller data that companion electronic device 204 provided to source electronic device 202 as described with reference to FIG. 6A, step 604. Then, the first application can use the controller data to perform an action for the activity performed in the first application at source electronic device 202. For example, in some embodiments, when the controller data includes a key press, movement, and/or a button press, the controller data causes corresponding input to be provided to the first application, e.g., causes a key press, movement, and/or button press to be provided to the first application. In this example, a user can use a keyboard for or presented by companion electronic device 204 to provide key presses to the first application, and/or a touch screen for companion electronic device 204 to move a cursor, perform gestures, press buttons, and/or draw at the first application. As another example, when the controller data includes data from a game controller and/or an accelerometer for companion electronic device 204, a user can use the game controller and/or accelerometer to play a game at source electronic device 202 (i.e., the first application comprises the game). As yet another example, when the controller data includes authentication data from a thumbprint reader at companion electronic device 204, source electronic device 202 can use the authentication data to authenticate a user for the activity performed in the first application at source electronic device 202.

As discussed earlier, in some embodiments, the first application is part of an operating system at source electronic device 202 (e.g., a process and/or service of the operating system, a device driver, etc.). In these embodiments, source electronic device 202 provides the controller data to first application, i.e., to a part of the operating system, which then passes the controller data (or information representing the controller data) to a third application, thereby enabling source electronic device 202 to emulate a connection to a controller that is not available at/connected to source electronic device 202 as if the controller were connected to source electronic device 202. In some embodiments, the third application is unaware that the controller is not available at source electronic device 202, i.e., is unaware that activity augmentation is taking place to provide the controller data.

Terminating Activity Augmentation

Companion electronic device 204 continues to perform operations for steps 602-604 (see FIG. 6A) and source electronic device 202 continues to perform operations for steps 650-652 (see FIG. 6B) until activity augmentation/cooperation between the first and the second application is terminated. Terminating activity augmentation generally comprises closing the cooperative-activity communication channel, i.e., stopping activity data and controller data exchanges over the cooperative-activity communication channel. In some embodiments, closing the cooperative-activity communication channel includes powering-off, putting to a sleep state, and/or otherwise disabling hardware at source electronic device 202 and/or companion electronic device 202 used to communicate through the cooperative-activity communication channel.

In some embodiments, source electronic device 202 terminates activity augmentation, which can include source electronic device 202 sending a signal to companion electronic device 204 to indicate that activity augmentation is to be terminated. In some embodiments, source electronic device 202 terminates the activity augmentation upon receiving a command to terminate the activity augmentation from a user at source electronic device 202. In some embodiments, source electronic device 202 terminates the activity augmentation by making a determination using data available at source electronic device 202, e.g., based on a timeout during which no user input is received at source electronic device 202, based on a timeout during which no communication is received from companion electronic device 204, based on a battery level, an operating state, or another operating parameter for source electronic device 202, etc. In some embodiments, source electronic device 202 terminates the activity cooperation upon receiving a signal to terminate the activity cooperation from companion electronic device 204.

In some embodiments, companion electronic device 204 terminates activity augmentation, which can include companion electronic device 204 sending a signal to source electronic device 202 to indicate that activity augmentation is to be terminated. In some embodiments, companion electronic device 204 terminates the activity augmentation upon receiving a command to terminate the activity augmentation from a user at companion electronic device 204. In some embodiments, companion electronic device 204 terminates the activity cooperation by making a determination using data available at companion electronic device 204, e.g., based on a timeout during which no user input is received at companion electronic device 204, based on a timeout during which no communication is received from companion electronic device 204, based on a battery level, an operating state, or another operating parameter for companion electronic device 204, etc. In some embodiments, companion electronic device 204 terminates the activity cooperation upon receiving a signal to terminate the activity cooperation from source electronic device 202.

Secure Communication Using Cloud Pairing

As discussed earlier, in some embodiments, electronic devices that perform operations for activity augmentation participate in a preliminary pairing operation, e.g., a "cloud pairing" operation, such as the predefined pairing described in pending U.S. patent application No. 62/005,751, which is titled "Predefined Wireless Pairing," by inventors Jason C. Conn, Akshay Mangalam Srivatsa, Craig P. Dooley, and Michael Giles, filed on the same day as the instant application, and the contents of which are incorporated by reference as described above. In some embodiments, electronic devices encrypt and decrypt messages exchanged with each other for performing activity augmentation operations using security information acquired during the cloud pairing operation, e.g., using encryption keys acquired during the cloud pairing operation.

For example, in some embodiments, source electronic device 202 encrypts the activity advertisement message (see FIG. 3, step 310) and/or the activity data (see FIG. 6B, step 650) using an encryption key acquired during the cloud pairing operation that source electronic device 202 performs with companion electronic device 204. In some embodiments, companion electronic device 204 encrypts controller data (see FIG. 6A, step 604) using the same security information, different security information acquired during the cloud pairing operation that companion electronic device 204 performs with source electronic device 202, and/or information derived from security information acquired during the cloud pairing operation. In some embodiments, source electronic device 202 and/or companion electronic device 204 encrypt information exchanged for establishing a cooperative-activity communication channel (see FIG. 5A, step 512, and FIG. 5B, step 554) using security information acquired during the cloud pairing operation.

Determining the Second Application Using a Controller Identifier

Figure 7:
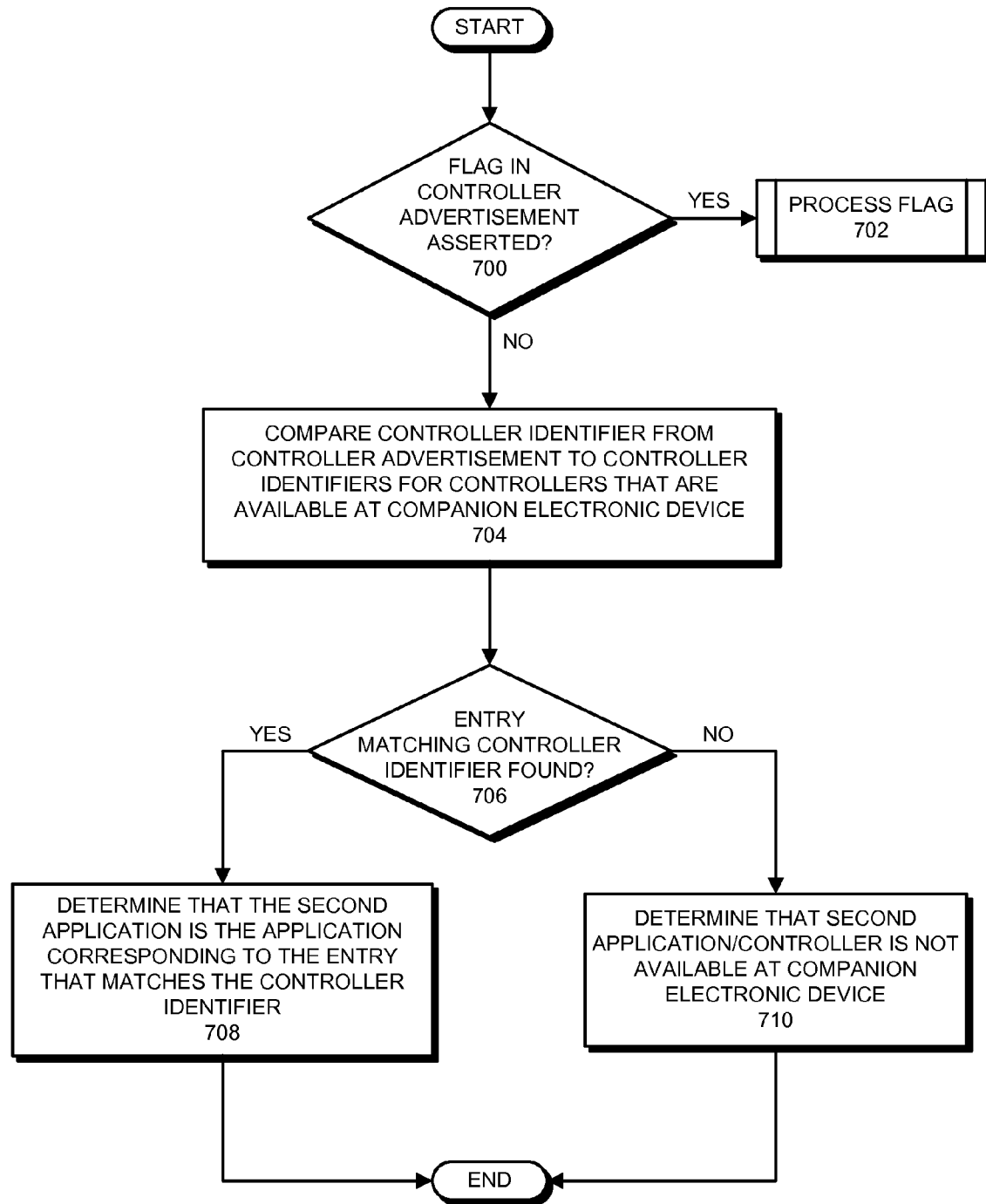
FIG. 7 presents a flowchart illustrating a process for determining whether a second application that can provide controller data for a controller advertised in a controller advertisement message is available at an electronic device.

As described earlier, in some embodiments, an electronic device determines whether a second application, i.e., a companion application, that can provide controller data for a controller advertised in a controller advertisement message is available at the electronic device. FIG. 7 presents a flowchart illustrating a process for determining whether a second application that can provide controller data for a controller advertised in a controller advertisement message is available at an electronic device. More specifically, during the process shown in FIG. 7, companion electronic device 204 determines whether a second application that can provide controller data to a first application, i.e., for a controller advertised in a controller advertisement message from source electronic device 204, is available at companion electronic device 204. The operations shown in FIG. 7 can be performed during the process shown in FIG. 5A, at step 504. Note that the operations shown in FIG. 7 are presented as a general example of operations performed by some embodiments. The operations performed by some embodiments include different operations and/or operations that are performed in a different order. Additionally, although certain mechanisms are used in describing the operations (e.g., companion electronic device 204, etc.), in some embodiments, other mechanisms perform the operations. For example, one or both of source electronic device 202 and second source electronic device 206 may perform similar operations to determine for themselves whether a second application is available.

The process shown in FIG. 7 starts when companion electronic device 204 determines whether a flag in the controller advertisement message is asserted (step 700). As described earlier, in some embodiments, source electronic device 202 asserts a flag in the controller advertisement message to indicate that the controller identifier is/comprises a representation of a domain name for the advertised activity. In some of these embodiments, companion electronic device 204 determines that the controller advertisement message comprises a representation of a domain name by determining that the flag is asserted. As was also described earlier, in some embodiments source electronics device 202 asserts a flag in the controller advertisement message that identifies the controller that the first application accepts controller data from. Flags are described in more detail later with reference to FIGS. 11 and 13.

If a flag in the controller advertisement message is asserted (step 700, yes), companion electronic device 204 processes the flag (step 702). The processing of the flag, which takes place at step 702, is described later with reference to FIG. 8. Some embodiments repeat step 702 (i.e., the processing described with reference to FIG. 8) for each asserted flag in the controller advertisement message, e.g., repeat the processing for each asserted flag when the controller advertisement message comprises two or more asserted flags.

If the controller advertisement message does not comprise a flag that is asserted (step 700, no), companion electronic device 204 compares the controller identifier from the controller advertisement message to controller identifiers for controllers that are available at companion electronic device 204 (step 704). For example, companion electronic device 204 can look up the controller identifier from the controller advertisement message in controller identifiers in the available-controller table at companion electronic device 204 (or other structure where companion electronic device 204 stores available controller information, as described earlier with reference to FIG. 4).

If the lookup for the controller identifier finds a match in an entry in the available-controller table (step 706, yes), companion electronic device 204 determines that the second application and/or controller described in the controller advertisement message is available at companion electronic device 204, i.e., determines that the second application is the application whose application identifier and/or controller descriptor is stored in the entry whose controller identifier matches the controller identifier in the controller advertisement message (step 708).

If the lookup for the controller identifier does not find a match in the available controller information (step 706, no), companion electronic device 204 determines that the second application/controller described in the controller advertisement message is not available at companion electronic device 204 (step 710).

Determining the Second Application Using a Flag

Figure 8:
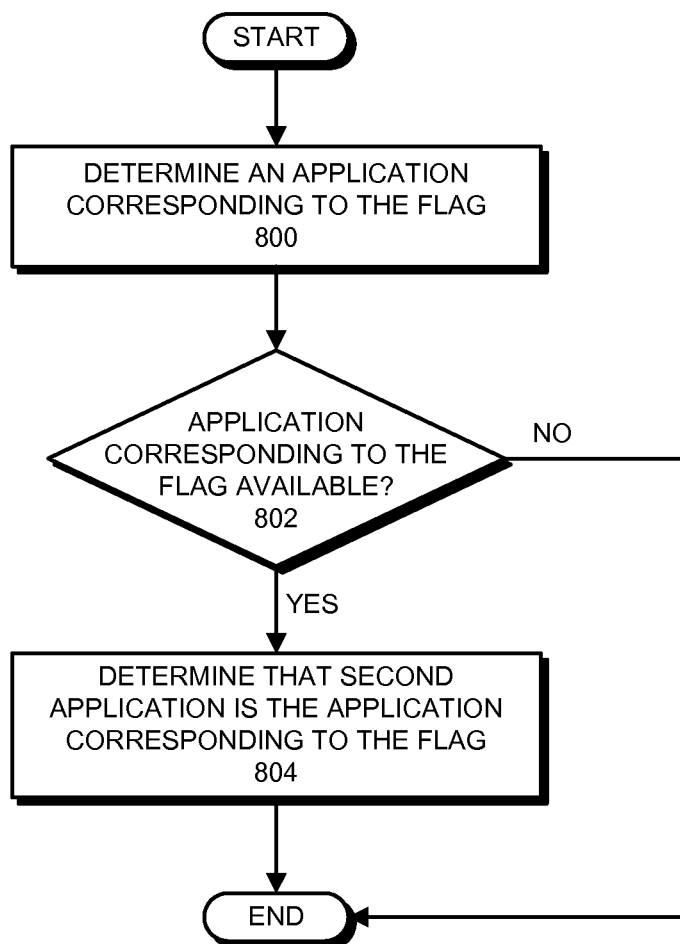
FIG. 8 presents a flowchart illustrating a process for determining the second application using a flag in accordance with some embodiments.

As described earlier, some embodiments assert a flag in the controller advertisement message. FIG. 8 presents a flowchart illustrating a process for determining the second application using a flag in accordance with some embodiments. More specifically, FIG. 8 presents a flowchart illustrating a process that companion electronic device 204 performs at step 702 of FIG. 7. Note that the operations shown in FIG. 8 are presented as a general example of operations performed by some embodiments. The operations performed by some embodiments include different operations and/or operations that are performed in a different order. Additionally, although certain mechanisms are used in describing the operations (e.g., companion electronic device 204, etc.), in some embodiments, other mechanisms perform the operations. For example, one or both of source electronic device 202 and second source electronic device 206 may perform similar operations for themselves.

The process shown in FIG. 8 starts when companion electronic device 204 determines an application corresponding to the flag (step 800). In some embodiments, companion electronic device 204 uses the position of the asserted flag and/or the value of the flag to determine the application corresponding to the flag. For example, when the controller advertisement message includes more than one flag that can be asserted, each of the flags can be used to identify a different application that can provide controller data. In some embodiments, the flag is a multi-bit field and different values of the multi-bit field identify a different application. In some embodiments, companion electronic device 204 stores a mapping that identifies the application to which the position/value of the flags corresponds.

Next, companion electronic device 204 determines whether the application corresponding to the flag is available at companion electronic device 204 (step 802). For example, companion electronic device 204 can check whether the application corresponding to the flag is installed at companion electronic device 204. In some embodiments, step 802 is not performed/is skipped, so that the process shown in FIG. 8 continues from step 800 to step 804. For example, step 802 is not performed in embodiments that use flags to identify only applications and/or operating system services that are expected to be available at companion electronic device 204.

If the application corresponding to the flag is available (step 802, yes), companion electronic device 204 determines that the second application is the application corresponding to the flag (step 804). The process then ends, which can include continuing to step 506 in FIG. 5A.

If the application corresponding to the flag is not available at companion electronic device 204 (step 802, no), the process ends. At this point, companion electronic device 204 can determine that the second application is not available (e.g., continue as in FIG. 5A, step 504, no), or can continue to step 704 in FIG. 7 to determine whether the second application is available by using the controller identifier from the controller advertisement message.

In some embodiments, source electronic device 202 sets a second flag (or a different value for the flag) in the controller advertisement message to indicate that source electronic device 202 will subsequently provide instructions/information describing how execute the helper activity and/or second application at companion electronic device 204. In some embodiments, the application corresponding to the flag comprises the instructions/information describing how execute the helper activity and/or second application. In some embodiments, source electronic device 202 can include the instructions/information describing how execute the helper activity and/or second application to companion electronic device 204 using the cooperative-activity communication channel.

Figure 9:
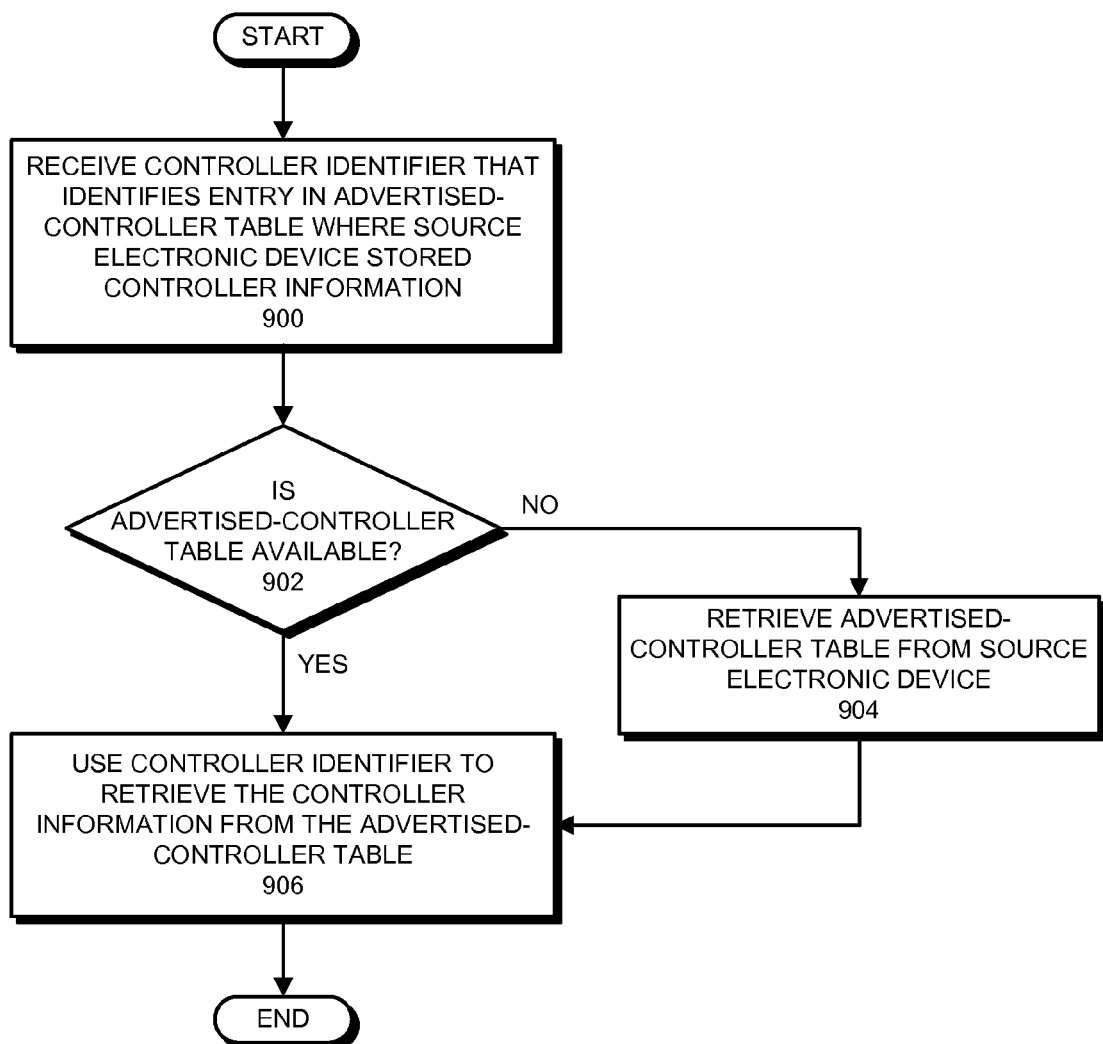
FIG. 9 presents a flowchart illustrating a process for determining whether a second application is available when a controller identifier identifies an entry in a structure that stores advertised controllers in accordance with some embodiments.

Determining the Second Application Using a Structure Storing Advertised Activities As described earlier with reference to FIG. 3, in some embodiments, the controller identifier in the controller advertisement message identifies an entry in a structure (e.g., an advertised-controller table) in which the electronic device that advertised the controller advertisement message stores controller information for the advertised controller. FIG. 9 presents a flowchart illustrating a process for determining whether a second application is available when a controller identifier identifies an entry in such a structure in accordance with some embodiments. More specifically, during the process shown in FIG. 9, companion electronic device 204 uses a controller identifier that identifies an entry in an advertised-controller table where source electronic device 202 stored controller information for the advertised controller to determine whether a second application that can provide controller data accepted by the first application is available at companion electronic device 204 (examples of advertised-controller tables are described in more detail below with reference to FIG. 12). Note that the operations shown in FIG. 9 are presented as a general example of operations performed by some embodiments. The operations performed by some embodiments include different operations and/or operations that are performed in a different order. Additionally, although certain mechanisms are used in describing the operations (e.g., source electronic device 202, companion electronic device 204), in some embodiments, other electronic devices and/or mechanisms perform the operations.

The process shown in FIG. 9 begins when companion electronic device 204 receives a controller identifier that identifies an entry in an advertised-controller table where source electronic device 202 stored controller information for the advertised controller (step 900). In some embodiments, the controller identifier includes a table identifier and an entry index, the table identifier identifying the advertised-controller table in which source electronic device 202 stored the controller information for the advertised controller, and the entry index identifying the entry in the advertised-controller table identified by the table identifier in which the controller information for the advertised controller is stored.

Next, companion electronic device 204 determines whether the advertised-controller table identified by the controller identifier is available at companion electronic device 204 (step 902). In some embodiments, companion electronic device 204 uses the table identifier from the controller identifier to determine whether companion electronic device 204 has stored a local copy of the advertised-controller table.

If the advertised-controller table for the controller identifier is not available at companion electronic device 204 (step 902, no), companion electronic device 204 retrieves the advertised-controller table from source electronic device 202 (step 904). In some embodiments, companion electronic device 204 requests that source electronic device 202 send the advertised-controller table identified by the controller identifier from the controller advertisement message, e.g., the advertised-controller table identified by the table identifier. Companion electronic device 204 can transmit such a request, and source electronic device 202 can respond to the request, using the cooperative-activity communication channel and/or a different channel.

In some embodiments, companion electronic device 204 periodically synchronizes its local copy/copies of advertised-controller tables with source electronic device 202. For example, companion electronic device 204 may receive a copy of an advertised-controller table from source electronic device 202 using a "push" mechanism, i.e., without sending a request for the copy of the advertised-controller table.

If the advertised-controller table for the controller identifier is available at companion electronic device 204 (step 902, yes), or after receiving the advertised-controller table from source electronic device 202 (step 904), companion electronic device 204 uses the controller identifier to retrieve the controller information from the advertised-controller table (step 906). For example, companion electronic device 204 can retrieve the controller information from the entry in the advertised-controller table that is identified by the entry index. As discussed earlier with reference to FIG. 5A, step 508, companion electronic device 204 can use the retrieved controller information to customize an indication that an activity is augmentable. In some embodiments, companion electronic device 204 uses the retrieved controller information to start performing the second application and/or to configure the second application to perform the helper activity, e.g., as described with reference to FIG. 6A, step 600.

In some embodiments, the operations shown in FIG. 9 enable information describing more than one controller to be advertised in a single controller advertisement message. For example, consider the case where the size of the controller advertisement message is limited, e.g., because of limitations of a network protocol used to broadcast the controller advertisement message. In this case, an entry identifier, i.e., a controller identifier that identifies an entry where controller information is stored, can be smaller than an encoded representation (i.e., represented using fewer bits than the controller identifier generated from the same controller information), enabling these embodiments to carry multiple entry identifiers in a controller advertisement message.

As described earlier with reference to FIG. 3, the described embodiments are not limited to using a table for storing the available controller information. Some embodiments use a different structure for storing the available controller information, such as an associative array, a content-addressable memory, etc. In these embodiments, the controller identifier can identify an entry in a structure in which source electronic device 202 stores controller information for the advertised controllers. For example, in these embodiments, the table identifier can identify the structure and the entry index can identify the index in the structure where source electronic device 202 stored the controller information for the advertised controller.

Also, although we describe embodiments that use one advertised-controller table, some embodiments use more than one advertised-controller table, e.g., store controller information for advertised controllers in different advertised-controller tables. For example, in some embodiments, advertised-controller tables may be generated in accordance with different configurations of the electronic device, such as when different applications are installed or removed from the electronic device, when different controllers are used by applications on the electronic device, etc.

Determining a Most Recent Controller Advertisement

Figure 10:
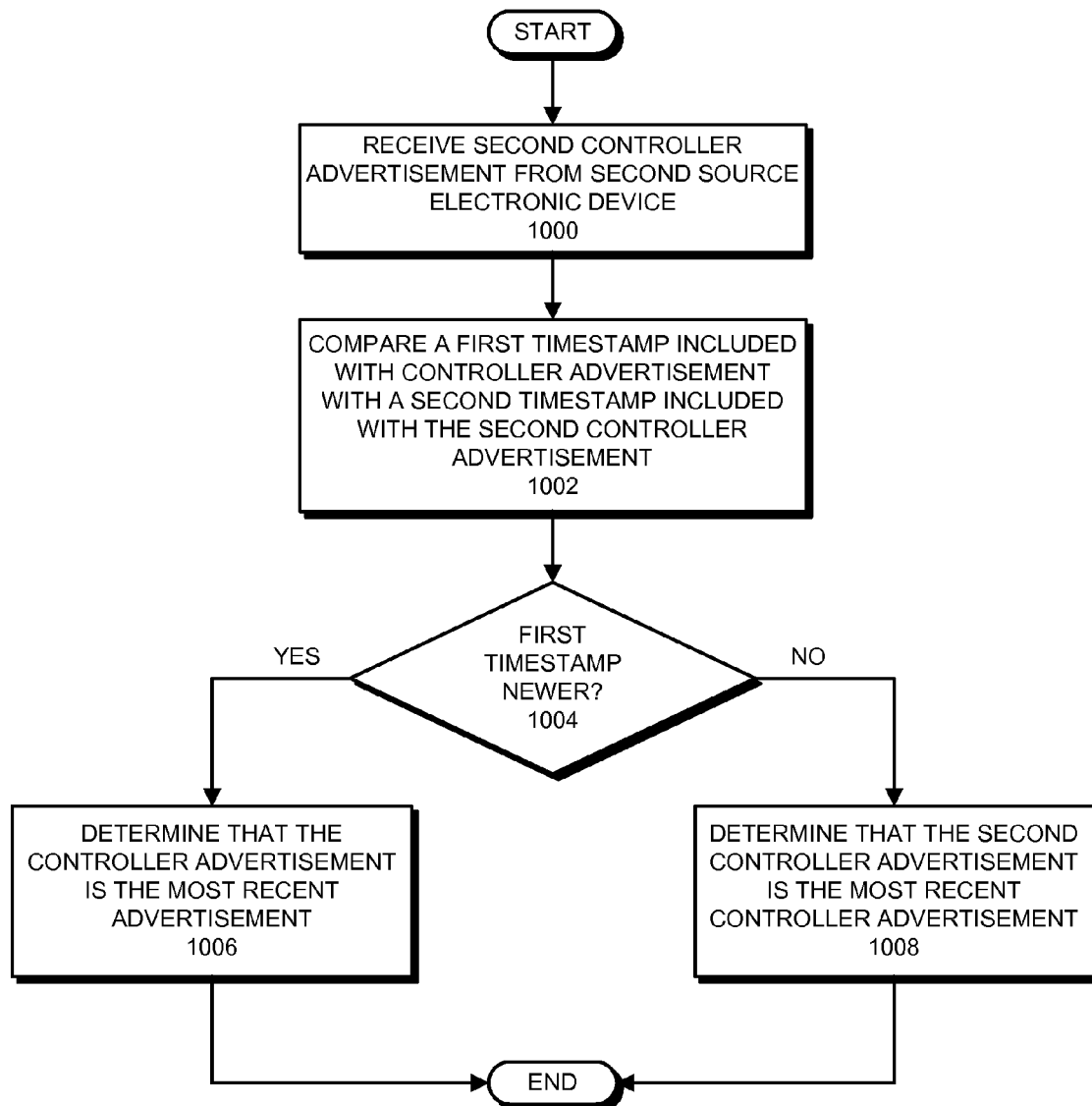
FIG. 10 presents a flowchart illustrating a process for determining a most recent controller advertisement message from two or more controller advertisement messages in accordance with some embodiments.

As described earlier, network environment 200 can include a second source electronic device, which can broadcast controller advertisement messages for controllers that can be used at the second source electronic device. As was also described earlier, some embodiments include a timestamp in a controller advertisement message for an application to indicate a time that an activity performed in the application was last performed. FIG. 10 presents a flowchart illustrating a process for determining a most recent controller advertisement message from two or more controller advertisement messages in accordance with some embodiments. More specifically, during the process shown in FIG. 10, companion electronic device 204 uses a timestamp included with the advertisement from source electronic device 202 ("controller advertisement") and a timestamp included an advertisement from second source electronic device 206 ("second controller advertisement") to determine the most recent controller advertisement from first advertisement and the second controller advertisement. Note that the operations shown in FIG. 10 are presented as a general example of operations performed by some embodiments. The operations performed by some embodiments include different operations and/or operations that are performed in a different order. Additionally, although certain mechanisms are used in describing the operations (e.g., source electronic device 202, companion electronic device 204, second source electronic device 206), in some embodiments, other electronic devices and/or mechanisms perform the operations.

For the process shown in FIG. 10, it is assumed that companion electronic device 204 has already received the controller advertisement message from source electronic device 202, e.g., as shown in FIG. 5A, step 500. Therefore, companion electronic device 204 has the controller advertisement, including a first timestamp, i.e., the timestamp included with the controller advertisement.

The process shown in FIG. 10 begins when companion electronic device 204 receives the second controller advertisement message (step 1000). Next, companion electronic device 204 compares the first timestamp with a second timestamp, i.e., the timestamp included with the second controller advertisement message (step 1002). For example, companion electronic device 204 can compare the timestamps to see which one is newer (i.e., indicates a more recent time).

If the comparison indicates that the first timestamp is newer (step 1004, yes), companion electronic device determines that the controller advertisement for the first application, i.e., the controller advertised in the controller advertisement, is the most recent advertisement (step 1006). Otherwise, if the comparison indicates that the second timestamp is newer (step 1004, no), companion electronic device 204 determines that the second controller advertisement, i.e., the controller advertised in the second controller advertisement, is the most recent controller advertisement (step 1008).

Figure 14:
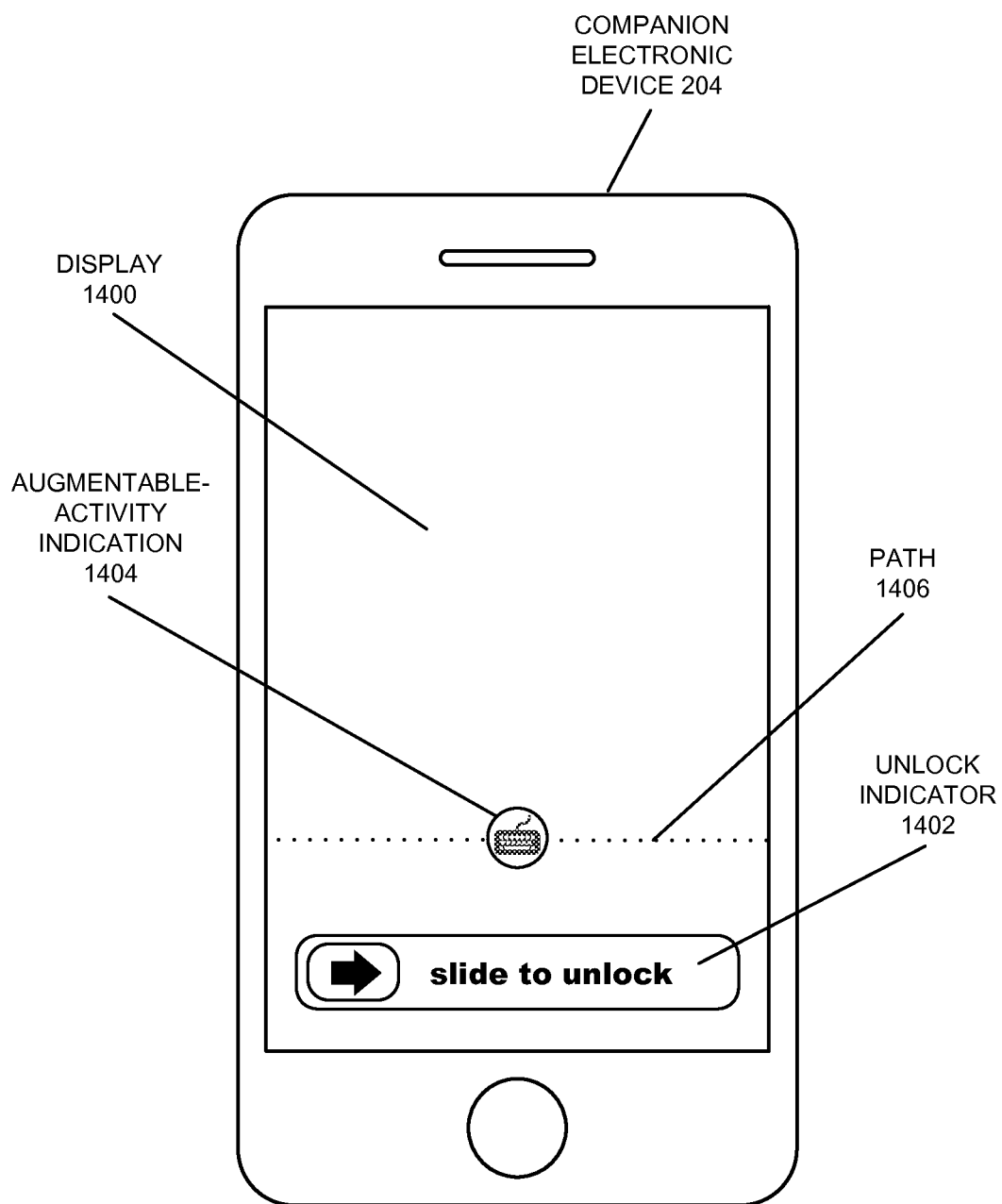
FIG. 14 presents a block diagram illustrating an augmentable-activity indication in accordance with some embodiments.

In some embodiments, companion electronic device 204 reduces the number of indications that are presented to a user in a display of companion electronic device 204 (e.g., as shown in FIG. 14) by only presenting an indication that an activity is augmentable for the most recent of the advertised controller advertisements. In some embodiments, companion electronic device 204 uses timestamps to present the indications that activities are augmentable in order, e.g., to present an indication for the most recent controller advertisement first, followed by other indications for controller advertisements in descending order based on relative recentness. In these embodiments, two or more indications can be presented side-by-side, one above the other, etc. in accordance with the relative recentness of the corresponding controller advertisement. Note that, by only presenting certain indications, these embodiments may limit the number of activities for which indications are shown, thereby simplifying the interface presented to the user, e.g., by presenting indications for fewer, more relevant augmentable activities than an entire set of possible augmentable activities.

In some embodiments, companion electronic device 204 uses a history of activities that have previously been augmented to present indications for activities that are augmentable in order. In some embodiments, companion electronic device 204 ranks activities that have previously been augmented higher in order, i.e., presents an indication that an activity that has previously been augmented is augmentable ahead of an indication that an activity that has not previously been augmented is augmentable. In some embodiments, two or more indications are presented in order based on a number of times that each of the corresponding activities has previously been augmented.

Controller Information

As described earlier, some embodiments use controller information that describes a controller from which an activity performed at an application at an electronic device is able to use controller data. FIG. 11 presents a block diagram illustrating controller information 1100, controller information 1110, controller information 1120, and controller information 1130 in accordance with some embodiments. Note that controller information 1100, controller information 1110, controller information 1120, and controller information 1130 shown in FIG. 11 are presented as a general example of formats of controller information used by some embodiments. Some embodiments use a different format and/or include different information in controller information.

Controller information 1100 includes application identifier 1102, which identifies the application used to perform the activity that can use controller data from the controller described in controller information 1100. For example, application identifier 1102, which includes the string com.apple.Keynote, identifies application Keynote, an application that can be used to edit and view presentations. Controller descriptor 1104 includes the string SlideshowRemote, which identifies that the activity performed with application Keynote can accept controller data from a slideshow remote control (e.g., a remote control for moving through slides while viewing a presentation). Timestamp 1106, which includes the string/number 103, identifies a time that the activity was last performed, for example, the last time that a user viewed the presentation in application Keynote. In some embodiments, the timestamp indicates a real time, e.g., the absolute/wall-clock time (or a representation thereof, such as a system time) when the activity was last performed, or it can be a representation of time elapsed since the activity was last performed after the top of the hour, or since a synchronization event. In some embodiments, the timestamp indicates a real time, e.g., the absolute/wall-clock time (or a representation thereof, such as a system time) when source electronic device 202 was last used (e.g., last used actively by a user), or it can be a representation of time elapsed since source electronic device 202 was last used after the top of the hour, or since a synchronization event. In controller information 1100, flag 1108 is not asserted.

Controller information 1110 includes application identifier 1112, which identifies the application used to perform the activity that can use the controller data from the controller described in controller information 1110. For example, application identifier 1112, which includes the string com.apple.TVMenu, identifies application TVMenu, an application that can be used to watch television and/or streaming video. Controller information 1110 does not include a controller descriptor and uses flag 1116 to describe the controller from which the activity performed in application TVMenu can accept controller data. For example, flag 1116 is set to the value 64, which corresponds to a keyboard, thereby indicating that the activity performed in application TVMenu accepts controller data from a keyboard. Timestamp 1114, which includes string/number 210, identifies a time that the activity was last performed, for example, the last time that the user used TVMenu to browse for and/or watch a video.

Controller information 1120 includes controller descriptor 1122, which identifies the controller that the electronic device that broadcast the controller advertisement message that includes controller information 1120 can accept controller data from. For example, controller descriptor 1122, which includes the string com.apple.GameControllerDeviceDriver, identifies that the sending device is seeking to receive controller data from a game controller, such as a joystick, accelerometer, etc. Controller information 1120 does not identify an application for the activity advertisement, because the controller descriptor alone is enough to identify the application that is seeking the controller data from the game controller. For example, controller descriptor 1122 identifies an application in an operating system (e.g., system process, device driver, etc.) that can provide controller data to a higher-level application, e.g., without the higher-level application having knowledge that the controller data is received from another device. Timestamp 1124, which includes the string/number 315, identifies a time that a user last used the sending device, e.g., the last time that a user actively interacted with the sending device.

Controller information 1130 includes application identifier 1132, which identifies the application used to perform the activity that can use the controller data described in controller information 1130. For example, application identifier 1132, which includes the string com.apple.Safari, identifies application Safari, a web browser. Controller descriptor 1134 includes the string www.evideostreamer.com, which identifies a domain name accessed with the web browser. In this example, controller descriptor 1134 holds a domain name, so flag 1138 in controller information 1130 is asserted to indicate that controller descriptor 1134 comprises a domain name. In this example, the second application can be an application that has claimed the domain name www.evideostreamer.com or an application corresponding to the flag. Timestamp 1136, which includes string/number 820, identifies a time that the web browser was last used to access the move-streaming website.

Figure 11:
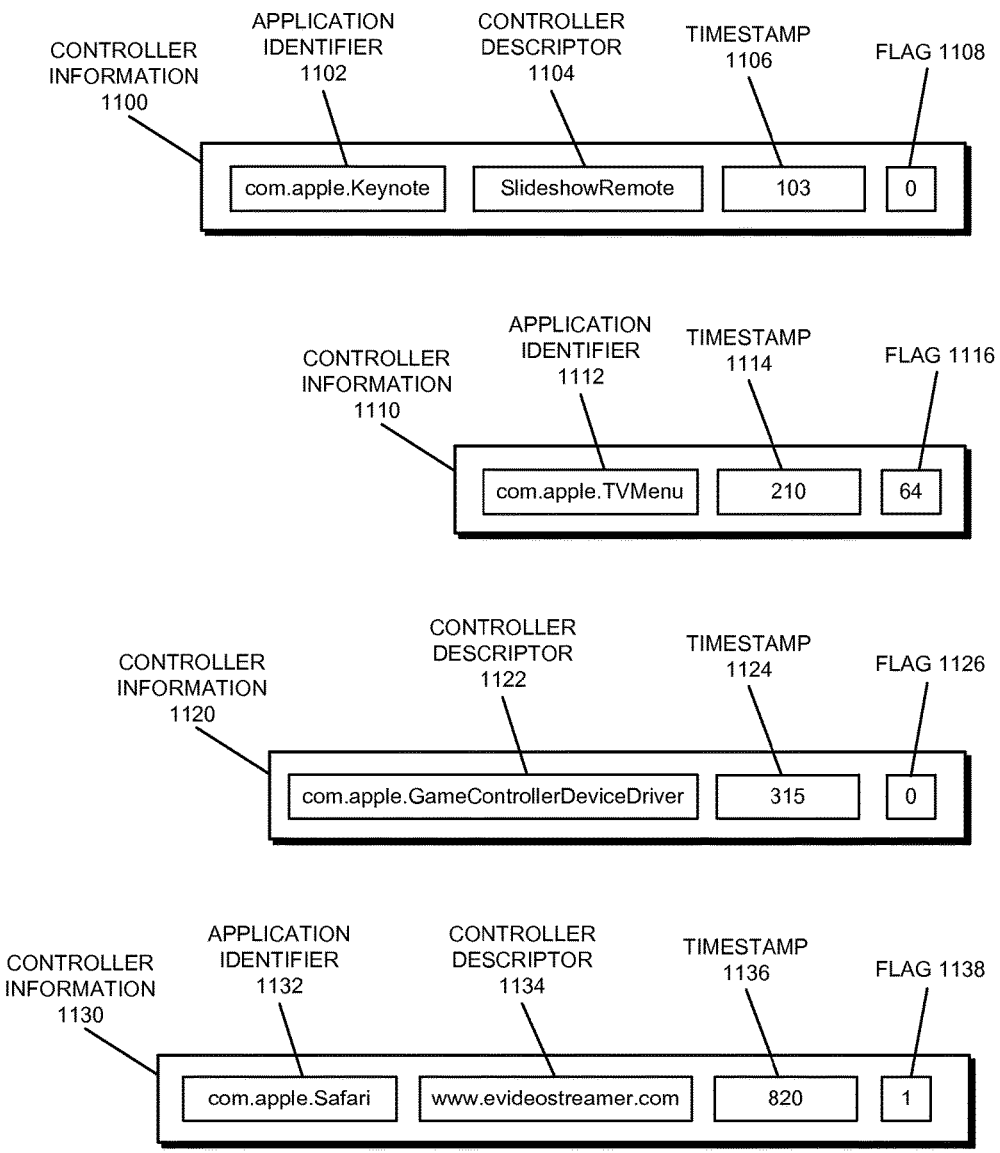
FIG. 11 presents a block diagram illustrating controller information in accordance with some embodiments.

For illustrative purposes, the timestamps shown in FIG. 11 are calculated as a delta (difference) from a synchronization event, e.g., the top of the hour. Hence, in the examples shown in FIG. 11, the controller advertisement message that includes controller information 1100 is the most recent controller advertisement message, because timestamp 1106 indicates that the least amount of time has elapsed from the top of the hour since the activity that can use controller data for the controller described in controller information 1100 was performed.

Note that, although the examples shown in FIG. 11 use strings for the application identifier and the controller descriptor, some embodiments may use different information to identify the application and/or the controller. For example, some embodiments use a numerical identifier for the application identifier and/or the controller descriptor. In some embodiments, the application identifier is an identifier for the corresponding application in an online "app store." As another example, some embodiments include an activity descriptor that describes an activity performed in the first application that is related to the controller information, i.e., an activity that can be augmented by using controller data from a controller described in the controller information (activity descriptors are discussed in more detail in the related U.S. patent application Ser. No. 62/005,781). Also, although the application identifier shown is separate from the controller descriptor, some embodiments combine the application identifier and the controller descriptor in a single identifier.

In some embodiments, application/app developers provide the information for the controller descriptors, such as controller descriptor 1104. In these embodiments, the developer of an application/app may determine a number of controllers that activities performed in the application/app can accept controller data from and may provide relevant values for controller descriptors.

Advertised-Controller Table

Figure 12:
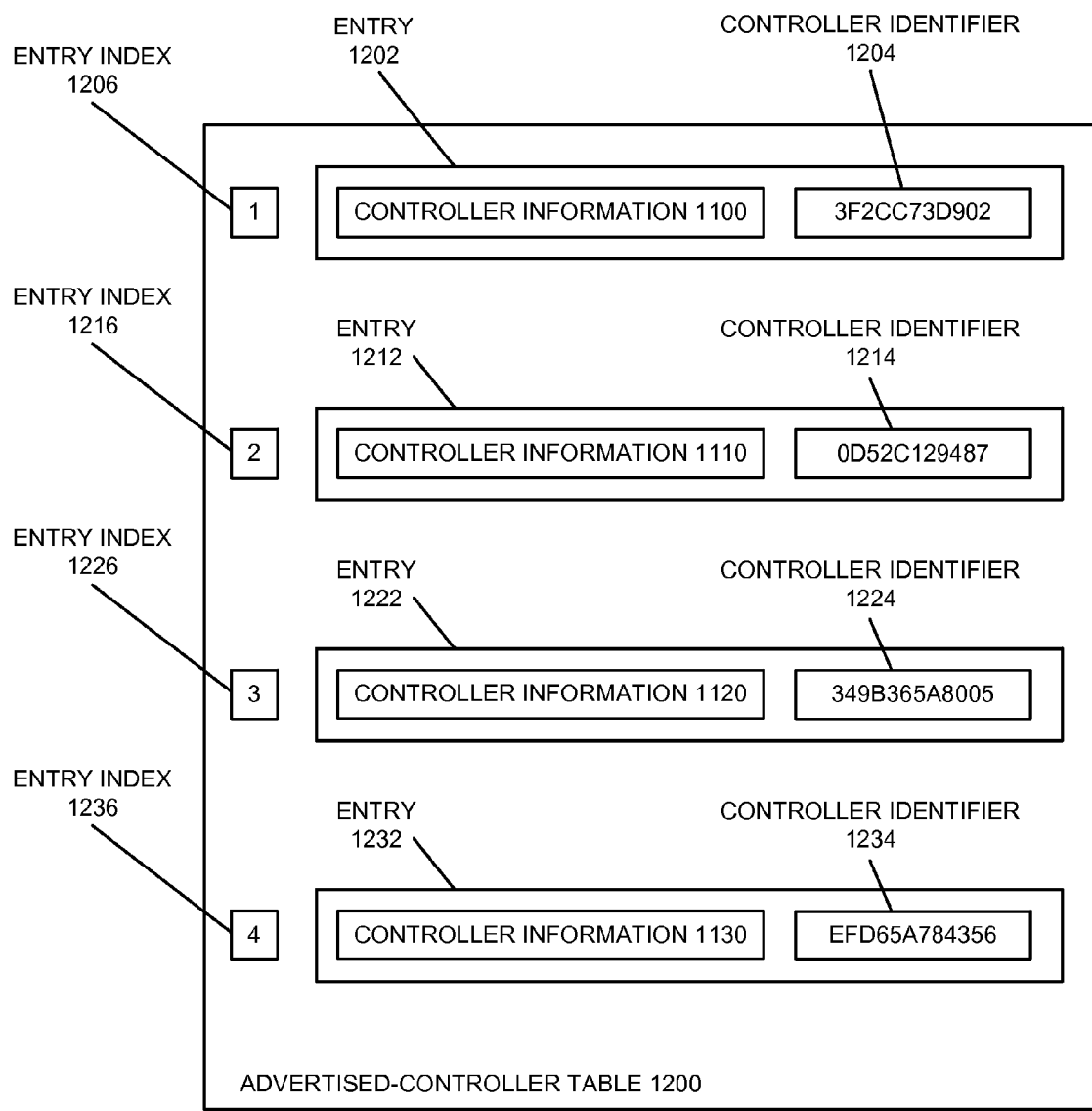
FIG. 12 presents a block diagram illustrating an advertised-controller table in accordance with some embodiments.

FIG. 12 presents a block diagram illustrating an advertised-controller table 1200 in accordance with some embodiments. As described above, advertised-controller table 1200 includes information about controllers that have been advertised (i.e., controllers for which a controller advertisement message has been sent by an electronic device such as source electronic device 202). Note that the advertised-controller table shown in FIG. 12 is presented as a general example of advertised-controller tables used by some embodiments.

Some embodiments represent controller information differently and/or include more or less information in the advertised-controller table.

Entry 1202, which is identified by entry index 1206, stores controller information 1100 and controller identifier 1204. In this example, controller identifier 1204 is generated using application identifier 1102 and controller descriptor 1104, such as a hash of string "com.apple.Keynote::SlideshowRemote."

Entry 1212, which is identified by entry index 1216, stores controller information 1110 and controller identifier 1214. In this example, controller identifier 1214 is generated using application identifier 1112, such as a hash of string "com.apple.TVMenu."

Entry 1222, which is identified by entry index 1226, stores controller information 1120 and controller identifier 1224. In this example, controller identifier 1224 is generated using controller descriptor 1122, such as a hash of string "com.apple.GameControllerDeviceDriver."

Entry 1232, which is identified by entry index 1236, stores controller information 1130 and controller identifier 1234. In this example, controller identifier 1234 is generated using controller descriptor 1122, such as a hash of string "www.evideostreamer.com."

For illustrative purposes, entries 1202-1232 store all of controller information 1100-1130, respectively. Note though that, in some embodiments, entries 1202-1232 store only some of controller information 1100-1130, respectively. For example, some embodiments do not store one or more of timestamp 1106, timestamp 1114, timestamp 1124, and/or timestamp 1136 in entries 1202-1232.

Available-Controller Table

In some embodiments, the above-described available-controller table is formatted similarly to advertised-controller table 1200 shown in FIG. 12. However, the entries in the available-controller table include controller information for controllers that are available in the corresponding electronic device, e.g., companion electronic device 204.

Controller Advertisement Message

FIG. 13 presents a block diagram illustrating a controller advertisement 1300, e.g., a controller advertisement message, in accordance with some embodiments. Note that the controller advertisement message shown in FIG. 13 is presented as a general example of a controller advertisement message used by some embodiments. Some embodiments order fields in the controller advertisement message differently and/or include different information in the controller advertisement message.

Controller advertisement message 1300 optionally includes device ID field 1302 and version ID field 1304. Device ID field 1302 includes an identifier that identifies the device from which controller advertisement message 1300 was sent, e.g. identifies source electronic device 202. Version ID field 1304 includes a version identifier, such as a version identifier that companion electronic device 204 can use to determine how fields in controller advertisement message 1300 are formatted and/or how information is stored in the fields.

Controller identifier field 1306 includes a controller identifier, e.g., one or more of controller identifiers 1204-1234. Flags field 1308 includes one or more flags corresponding to the advertised controller, e.g., flag 1108, flag 1116, flag 1126, and/or flag 1138.

Timestamp field 1310 includes a timestamp for a controller advertised in controller identifier field 1306, e.g., one or more of timestamp 1106, timestamp 1114, timestamp 1124, and timestamp 1136.

Augmentable-Activity Indication

As described earlier, some embodiments present an indication at an electronic device that the electronic device can be used to augment an activity performed at another electronic device. FIG. 14 presents a block diagram illustrating an augmentable-activity indication, i.e., an indication presented at an electronic device (e.g., companion electronic device 204) to indicate that the electronic device can be used to augment an activity performed at another electronic device (e.g., source electronic device 202), in accordance with some embodiments. More specifically, FIG. 14 shows an augmentable—activity indication displayed on display 1400 for companion electronic device 204. Note that the augmentable-activity indication shown in FIG. 14 is presented as a general example of an augmentable-activity indication used by some embodiments. Some embodiments use a different augmentable-activity indication and/or present the augmentable-activity indication differently.

In the illustrated embodiment, companion electronic device 204 is a smartphone that comprises a touch-screen display 1400. The embodiment shown in FIG. 14 is in a receptive state because display 1400 shows a lock screen with unlock indicator 1402, which shows the phrase "slide to unlock." Generally, a user of companion electronic device 204 performs an operation with unlock indicator 1402 to unlock companion electronic device 204, such as sliding a graphic for unlock indicator 1402 across display 1400 with a finger.

Augmentable-activity indication 1404 comprises a graphic, e.g., an icon, that a user can manipulate to accept (or reject) the activity augmentation. In FIG. 14, augmentable-activity indication 1404 comprises an icon resembling a keyboard, indicating that the augmentable activity accepts controller data from a keyboard. In some embodiments the user can accept the activity augmentation by clicking on/touching augmentable-activity indication 1404, and/or by moving augmentable-activity indication 1404 along a path on display 1400. For example, in some embodiments the user can accept the activity augmentation by touching and dragging augmentable-activity indication 1404 along or near path 1406 (shown as a dotted line).

For illustrative purposes, augmentable-activity indication 1404 is shown at a lock screen for companion electronic device 204. In some embodiments, augmentable-activity indication 1404 can be shown at a different screen/location, e.g., at an unlocked screen, at a menu bar, by using a notification window/pop-up, etc. Also, the position, size, graphic, color and/or other visual features of augmentable-activity indication 1404 can vary for different embodiments, and can depend on the type of activity that can be resumed. For example, in some embodiments companion electronic device 204 determines the graphic shown in augmentable-activity indication 1404 based on the application identifier and/or the controller descriptor for the advertised controller. As another example, in some embodiments, augmentable-activity indication 1404 is shown at the lower left corner of display 1400. Some embodiments present multiple augmentable-activity indicators at the same time.

Note that accepting (or rejecting) the activity augmentation can include moving augmentable-activity indication 1404 along a different path than path 1406, e.g., to the top of the screen, along a curved path, etc. In some embodiments, the user can accept the activity augmentation by clicking on augmentable-activity indication 1404, by tapping on augmentable-activity indication 1404, by swiping augmentable-activity indication 1404, by performing a gesture using augmentable-activity indication 1404, etc.

Automatic and Manual Controller Advertisement

In some embodiments, source electronic device 202 broadcasts controller advertisements automatically, e.g., at predetermined time intervals, as soon as controller information is received, based on a detected location of source electronic device 202, etc. In these embodiments, source electronic device 202 can provide a setting, e.g., a system preference, that a user can use to turn the broadcasting of controller advertisement messages on or off.

In some embodiments, source electronic device 202 starts broadcasting controller advertisement messages manually, i.e., waits for input from a user to begin broadcasting the controller advertisement messages. In some of these embodiments, source electronic device 202 starts broadcasting controller advertisement messages upon detecting the user's input, and continues to broadcast controller advertisement messages for a predetermined period of time and/or until the user provides an input directing source electronic device 202 to stop the controller advertisement messages. In some embodiments, the user input for starting and/or stopping controller advertisement messages includes motion of source electronic device 202 (e.g., shaking source electronic device 202, moving source electronic device 202 in an arc, rocking source electronic device 202, etc.), performing one or more gestures on a touch screen for source electronic device 202, pressing a key and/or button combination, etc.

In some embodiments, the controller advertisement message and/or a message that source electronic device 202 sends to companion electronic device 204 along with (i.e., in addition to) the controller advertisement message causes companion electronic device 204 to start a timer. In some embodiments, companion electronic device 204 remains in the receptive state as described above until this timer expires. Source electronic device 202 can provide an expiry time for the timer to companion electronic device 204, or companion electronic device 204 can determine the expiry time.

In some embodiments, companion electronic device 204 presents an indication that companion electronic device 204 can be used to augment the activity performed at source electronic device 202 until the timer expires, and, if the user accepts the indication, augments the activity at companion electronic device 204 without the user performing one or more operations (e.g., fingerprint scan, password entry, etc.) to unlock companion electronic device 204. More specifically, companion electronic device 204 can detect that the user accepted the indication and can bypass the lock screen/unlock operation, allowing the user to start using companion electronic device 204 without unlocking companion electronic device 204. In some embodiments, the user is allowed to bypass the lock screen/unlock operation only before the timer expires.

Activity Augmentation Framework

In some embodiments, a third-party application receives access to some or all of the activity augmentation operations, e.g., operations described earlier with reference to FIGS. 3-10, through an "activity augmentation" framework that is available at electronic devices that can participate in activity augmentation operations. The activity augmentation framework can provide the third-party application access to an operating system function, a daemon, a process, a service, etc., that performs at least some of the activity augmentation operations. For example, in some embodiments, the provider of an electronic device and/or operating system for the electronic device provides an application programming interface (API) through which third-party applications can make calls to functions that facilitate activity augmentation operations. In some embodiments, the activity augmentation framework enables third-party applications (and third-party application developers) to augment an activity performed at one electronic device with controller data from another electronic device without implementing (or even having knowledge of) the low-level details of activity augmentation.

For example, in some embodiments, to enable the third-party application to participate in activity augmentation operations, the third-party application developer provides controller descriptors for controllers that the third-party application can accept controller data from and a method for the third-party application to be receive the controller data. In some of these embodiments, at an electronic device such as source electronic device 202, the third-party application makes a call to a function provided by the activity augmentation framework to provide a controller descriptor (and possibly activity data) for a controller from which an activity performed in the third-party application can accept controller data. At an electronic device such as companion electronic device 204, to configure the third-party application to provide the controller data, the activity augmentation framework can pass the activity data to the third-party application (e.g., through a command line switch or parameter, by using an object, etc.). Subsequently, source electronic device 202 can receive controller data from the activity augmentation framework, e.g., as events, by querying the activity augmentation framework, etc. Hence, the activity augmentation framework can facilitate activity augmentation for third-party applications with minimal effort and expense for the third-party application developer.

Messages Exchanged Between Electronic Devices

Figure 15:
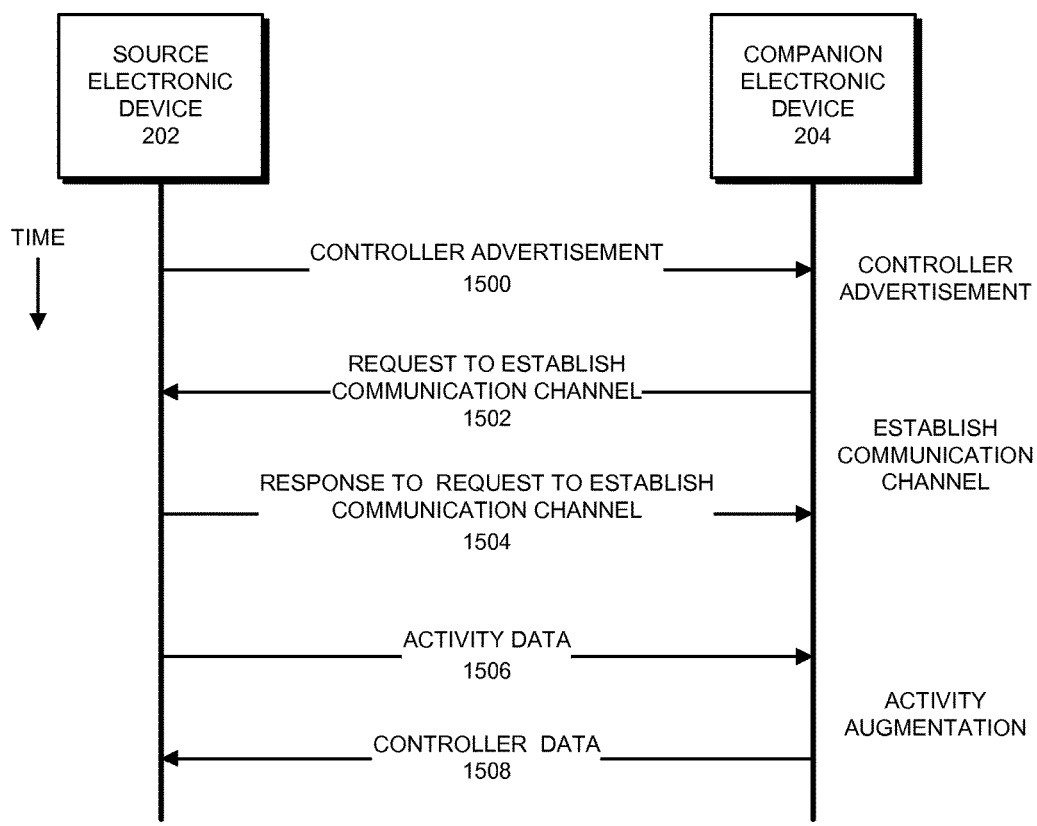
FIG. 15 presents a swim lane diagram illustrating messages exchanged between electronic devices in accordance with some embodiments.

FIG. 15 presents a swim lane diagram illustrating messages exchanged between electronic devices in accordance with some embodiments. As can be seen in FIG. 15, the messages are exchanged between source electronic device 202 and companion electronic device 204 over a period of time, with controller advertisement 1500 occurring first in time and the lower messages occurring subsequently in time. Although FIG. 15 is shown with messages exchanged in a particular order, in some embodiments, other messages are exchanged and/or messages are exchanged in a different order. Generally, electronic devices in the described embodiments exchange sufficient messages to enable the operations herein described.

The messages in FIG. 15 are associated with three operations performed by source electronic device 202 and/or companion electronic device 204. The first operation, which includes controller advertisement 1500, is a controller advertisement operation such as is shown in FIG. 3. During the controller advertisement operation, source electronic device 202 broadcasts at least one controller advertisement 1500.

The second operation, which includes request to establish communication channel 1502, and response to request to establish communication channel 1504, is an operation to establish a communication channel such as shown in FIGS. 5A-5B. During the operation to establish the communication channel, companion electronic device 204 responds to controller advertisement 1500 with request to establish communication channel 1502. Upon receiving request to establish the communication channel 1502, source electronic device 202 responds by sending response to request to establish communication channel 1504.

The third operation, which includes activity data 1506 and controller data 1508, is an operation for activity augmentation such as shown in FIGS. 6A-6B. During the operation for activity augmentation, companion electronic device 204 provides activity data 1506, e.g., activity data that the second application can use to perform a helper activity related to the activity performed in the first application. Companion electronic device 204 provides controller data 1508, e.g., controller data that the first application can use to augment the activity performed in the first application. Source electronic device 202 can continue (periodically, as events happen, etc.) providing activity data, e.g., such as activity data 1506, and companion electronic device 204 can continue (periodically, as events happen, as control inputs are received, etc.) providing controller data, e.g., such as controller data 1508, until the activity augmentation is terminated.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method performed by a companion electronic device, the method comprising:
  receiving a controller advertisement message from a source electronic device, the controller advertisement message including a controller identifier associated with a first application running on the source electronic device, the controller advertisement message transmitted through a first communication channel;
  in response to receiving the controller advertisement message, determining that the companion electronic device includes a second application associated with the controller identifier;
  in response to determining that the companion electronic device includes a second application associated with the controller identifier:
    sending a request through the first communication channel to the source electronic device, the request including information to establish a second communication channel to the source electronic device, and
    establishing the second communication channel with the source electronic device, where the second communication channel is distinct from the first communication channel;
  receiving controller data from the second application on the companion electronic device;
  sending the controller data to the source electronic device through the second communication channel,
  wherein the controller data is configured to cause the first application to perform an activity at the source electronic device.

2. The method of claim 1, wherein the first communication channel and the second communication channel use a wireless network interface.

3. The method of claim 1, wherein the second application obtains the controller data from a microphone.

4. The method of claim 1, wherein the second application obtains the controller data from a camera.

5. The method of claim 1, wherein the second application obtains the controller data from a thumbprint reader.

6. The method of claim 1, wherein the second application obtains the controller data from a keyboard, a touch screen, a game controller, an accelerometer, a remote control, or a network controller.

7. The method of claim 1, wherein the first communication channel includes a Bluetooth Low Energy (BLE) communication channel.

8. The method of claim 1, wherein the second communication channel includes a local area network.

9. The method of claim 1, wherein the first communication channel comprises a peer-to-peer networks channel.

10. The method of claim 1, wherein the second communication channel includes a wide area network.

11. A companion electronic device comprising:
  one or more processors; and
  a non-transitory computer readable medium including one or more sequences of instructions that, when executed by the one or more processors, cause the processors to configured to perform operations for:
    receiving a controller advertisement message from a source electronic device, the controller advertisement message comprising information including a controller identifier associated with a first application running on the source electronic device, the controller advertisement message transmitted through a first communication channel;
    in response to receiving the controller advertisement message, determining that the companion electronic device includes a second application associated with the controller identifier;
    in response to determining that the companion electronic device includes a second application associated with the controller identifier:
      sending a request through the first communication channel to the source electronic device, the request including information to establish a second communication channel to the source electronic device, and
      establishing the second communication channel with the source electronic device, where the second communication channel is distinct from the first communication channel;
    receiving controller data from the second application on the companion electronic device;
    sending the controller data to the source electronic device through the second communication channel,
    wherein the controller data is configured to cause the first application to perform an activity at the source electronic device.

12. The companion electronic device of claim 11, wherein the first communication channel and the second communication channel use a wireless network interface.

13. The companion electronic device of claim 11, wherein the second application obtains the controller data from a microphone.

14. The companion electronic device of claim 11, wherein the second application obtains the controller data from a camera.

15. The companion electronic device of claim 11, wherein the second application obtains the controller data from a thumbprint reader.

16. The companion electronic device of claim 11, wherein the second application obtains the controller data from a keyboard, a touch screen, a game controller, an accelerometer, a remote control, or a network controller.

17. The companion electronic device of claim 11, wherein the first communication channel comprises a Bluetooth channel.

18. The companion electronic device claim 11, wherein the second communication channel comprises a local area network.

19. The companion electronic device of claim 11, wherein the first communication channel comprises a peer-to-peer Wi-Fi.

20. The companion electronic device of claim 11, wherein the second communication channel comprises an wide area network.

* * * * *